United States Patent
Wang et al.

(10) Patent No.: US 7,271,948 B1
(45) Date of Patent: Sep. 18, 2007

(54) METHOD AND APPARATUS FOR REDUCING CROSSTALK AND NONLINEAR DISTORTIONS INDUCED BY RAMAN INTERACTIONS IN A WAVELENGTH DIVISION MULITPLEXED (WDM) OPTICAL COMMUNICATION SYSTEM

(75) Inventors: Jun J Wang, Horsham, PA (US); Kerry Litvin, Huntingdon Valley, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 11/612,832

(22) Filed: Dec. 19, 2006

(51) Int. Cl.
*H01S 3/00* (2006.01)

(52) U.S. Cl. .......................... 359/334; 398/79; 398/188

(58) Field of Classification Search .................. 398/48, 398/68, 79, 90, 91, 188; 359/334
See application file for complete search history.

(56) References Cited

U.S. PATENT DOCUMENTS

| | | | |
|---|---|---|---|
| 5,841,557 A * | 11/1998 | Otsuka et al. ................. 398/65 |
| 5,847,862 A * | 12/1998 | Chraplyvy et al. ......... 359/337 |
| 6,516,113 B1 * | 2/2003 | Glingener et al. ............. 385/24 |
| 6,556,736 B2 * | 4/2003 | Doerr et al. ................... 385/14 |
| 6,606,178 B1 * | 8/2003 | Rhee et al. ................. 398/188 |

\* cited by examiner

*Primary Examiner*—Mark Hellner
(74) *Attorney, Agent, or Firm*—Larry T. Cullen

(57) ABSTRACT

A method and apparatus is provided for transmitting a WDM optical signal. The method begins by modulating a plurality of optical channels that are each located at a different wavelength from one another with (1) a respective one of a plurality of information-bearing electrical signals that all embody the same broadcast information and (2) a respective one of a plurality of RF signals having a common functional broadcast waveform, at least one of the RF signals being out of phase with respect to remaining ones of the plurality of RF signals. Each of the modulated optical channels are multiplexed to form a WDM optical signal. The WDM optical signal is forwarded onto an optical transmission path.

28 Claims, 4 Drawing Sheets

METHOD AND APPARATUS FOR REDUCING CROSSTALK AND NONLINEAR DISTORTIONS INDUCED BY RAMAN INTERACTIONS IN A WAVELENGTH DIVISION MULITPLEXED (WDM) OPTICAL COMMUNICATION SYSTEM

FIELD OF THE INVENTION

The invention relates generally to the transmission of wavelength division multiplexed (WDM) optical signals, and more particularly to a method and apparatus for reducing crosstalk and nonlinear signal distortions induced by Raman interactions between the optical channels.

BACKGROUND OF THE INVENTION

In recent years wavelength division multiplexed (WDM) optical transmission systems have been increasingly deployed in optical networks. These include coarse wavelength division multiplexed (CWDM) and dense wavelength division multiplexed (DWDM) systems. Whether a system is considered to be CWDM or DWDM simply depends upon the optical frequency spacing of the channels utilized in the system. Although WDM optical transmission systems have increased the speed and capacity of optical networks, the performance of such systems is limited by various factors such as chromatic dispersion and the fiber nonlinearity, which can cause pulse shape change in the case of baseband digital signals and distortions in case of analog signals. These impairments degrade the quality of the optically transmitted information. Fiber nonlinearities, for example, can give rise to crosstalk between optical signals operating at different wavelengths. When crosstalk occurs, modulation components of one signal are superimposed on another signal at a different wavelength. If the level of crosstalk is sufficiently large it will corrupt the information being transmitted by the optical signals impacted by this impairment.

One common cause of crosstalk, in an optical fiber communication system with multiple wavelengths, is Raman scattering. This type of crosstalk is caused by stimulated Raman scattering (SRS) in silica fibers (and other materials) when a pump wave co-propagates with a signal wave through it. Stimulated Raman scattering is an inelastic scattering process in which an incident pump photon loses its energy to create another photon of reduced energy at a lower frequency. The remaining energy is absorbed by the fiber medium in the form of molecular vibrations (i.e. optical phonons) FIG. (1) is a schematic diagram of the stimulated Raman scattering process. The picture depicts a pump photon scattering in the Raman media. As a result of the scattering event the pump photon is annihilated and a new signal photon at the Stokes frequency is created along with an optical phonon at the Stokes shift frequency. Both energy and momentum are conserved:

$$\hbar \omega_{pump} = \hbar \omega_{signal} + \hbar \omega_{Op\ phonon} \text{ and } \hbar \vec{k}_{pump} =$$
$$\hbar \vec{k}_{signal} + \hbar \vec{k}_{Op\ phonon},$$

where $\omega_x$ is the frequency of x and $k_x$ is the associated wavevector of x and $\hbar$ is Planck's constant divided by $2\pi$.

The difference between the optical frequency of the pumping wave (the higher frequency) and the wave being amplified is referred to as the Stokes shift. The Raman gain window of a typical silica fiber is about 25 THz (terahertz) wide. The Stokes shift for the maximum Raman power transfer, in a typical silica fiber, is approximately 13 THz. The Raman gain between two optical signals increases from zero as the frequency separation between the two signal increases until the peak gain is reached at a 13 THz separation. It then decreases back to zero as the separation increases beyond 25 THz. As a result of SRS, energy from the pump wavelength can amplify a signal at a longer wavelength (lower optical frequency) so long as the optical frequency separation between the two signals falls within the Raman gain window of the fiber. The pumping wave loses energy (pump photon annihilation) to the signal wavelength (Stokes shifted photon creation) and also to the fiber (optical phonon creation). Thus, due to SRS, the pump amplitude decreases as its photon population depletes while the signal wavelength is amplified as its photon population increases.

SRS amplification is a benign process if the pump wave is not modulated with any type of information that would cause its amplitude to change with time. In this case the Raman amplification is fixed at a constant level over time. This simply serves to boost the amplitude of the Stokes shifted signal but does not disturb the information that it might be carrying. Problems arise, however, when both the pump and signal wavelengths are modulated. In this case the amplitude of the pumping wavelength is changing over time and, hence, the SRS amplification level varies in concert with the pump modulation. This process imparts a scaled replica of the pump modulation onto the signal wavelength which is referred to as crosstalk. The crosstalk can interfere with and degrade the quality of the original information being transmitted by the signal wavelength. The level of the crosstalk modulation depends upon the Raman gain value, which, in turn, depends upon the optical frequency separation of the transmitted waves, amongst other parameters. Furthermore, the crosstalk process is a shared experience between the pump and signal wavelengths when they are both modulated. It is more probable that a pump photon will scatter and be annihilated in an SRS event when there are more signal photons available to facilitate the process. Therefore, at points in time-space where the signal wavelength is peaked, due to the modulation it carries, the pump will more easily lose photons during SRS. The reverse is true, as well, at points in time-space where the signal wavelength is smaller due to the time varying modulation it carries the pump is less likely to lose a photon in an SRS event. Hence the pump loses photons in concert with the signal wavelength's modulation. The result is that an inverted scaled replica of the signal wavelength's modulation is imparted upon the pump wavelength. This crosstalk can interfere with and degrade the quality of the original information being transmitted by the pump wavelength.

FIG. 2 shows how this transfer of energy gives rise to crosstalk. FIG. 2 is a simplified illustration that is useful in facilitating an understanding of Raman crosstalk between two optical channels or signals $S_i$ and $S_j$, where $S_j$ is at a longer wavelength than $S_i$. FIG. 2A shows the signal $S_i$ and FIG. 2B shows the signal $S_j$. For simplicity of illustration $S_j$ is shown as a signal with constant amplitude (i.e. a continuous string of zeros or ones). As indicated in FIG. 2C, the pattern of signal $S_i$ (dashed line) is impressed on the signal $S_j$ by the process of Raman amplification. In other words, signal $S_j$ now includes as one of its components the pattern of signal $S_i$. Likewise, since signal $S_i$ is pumping the signal $S_j$, the pattern of signal $S_j$ (had it been modulated) would be impressed upon the pump $S_i$ by the process of pump depletion. In a multiple wavelength system (three or more wavelengths) the crosstalk process is similar to what has already been described but the complexity grows since now there are multiple pumping sources and multiple signals generating crosstalk on each of the optical waves. The Raman crosstalk is a problem for both analog and digital modulation schemes.

In addition to the generation of unwanted crosstalk the SRS process can also lead to the generation of Raman induced second order (CSO: composite second order) and third order (CTB: composite triple beat) distortions. These distortions occur as result of the nonlinear nature of the Raman amplification process which, in the undepleted regime, is exponential in form. Suppose there are two optical waves at wavelengths $\lambda_s$ (the signal wavelength) and $\lambda_p$ (the pump wavelength) propagating through a fiber of length L with a corresponding Raman gain coefficient $G_{sp}$. If at the transmitter site the instantaneous optical power associated with $\lambda_p$ is $P_p(t)$ and the instantaneous optical power associated with $\lambda_s$ is $P_s(t)$ then, in the undepleted power regime, the optical power at the wavelength $\lambda_s$ at position L due to the Raman scattering is given by:

$$P_s(t,L) = P_s(t)e^{[G_{sp}\bar{\rho}_L L_{\text{eff}} P_p(t) - \alpha L]} \text{ if } \lambda_p < \lambda_s \tag{1a}$$

or $$P_s(t, L) = P_s(t)e^{\left[-G_{sp}\bar{\rho}_L L_{\text{eff}} \frac{\tilde{n}_p \lambda_p}{\tilde{n}_s \lambda_s} P_p(t) - \alpha L\right]} \text{ if } \lambda_s < \lambda_p \tag{1b}$$

Here $L_{\text{eff}}$ is the effective length in the fiber at the pump wavelength, $\alpha$ is the power attenuation factor in the fiber at the signal wavelength, $\bar{\rho}_L$ is the running average probability of finding the two signals in the same state of polarization, $\tilde{n}_p$ and $\tilde{n}_s$ are the indices of refraction at the respective wavelengths. By defining a simple function $H_{s,p}$:

$$H_{s,p} \equiv \begin{cases} 1 & \lambda_s > \lambda_p \\ -1 \frac{\tilde{n}_p \lambda_p}{\tilde{n}_s \lambda_s} & \lambda_s < \lambda_p \end{cases} \tag{1c}$$

Then (1a) and (1b) can be combined into a single equation:

$$P_s(t,L) = P_s(t)e^{[H_{sp} G_{sp}\bar{\rho}_L L_{\text{eff}} P_p(t) - \alpha L]} \tag{1d}$$

This will come in handy when addressing a multi-wavelength optical communication system.

Expanding the exponential in (1a) gives:

$$P_s(t, L) = P_s(t)\left[1 + G_{sp}\bar{\rho}_L L_{\text{eff}} P_p(t) + \frac{(G_{sp}\bar{\rho}_L L_{\text{eff}})^2}{2}(P_p(t))^2 + \ldots\right]e^{-\alpha L}$$

$$= \left[P_s(t) + G_{sp}\bar{\rho}_L L_{\text{eff}} P_s(t)P_p(t) + \frac{(G_{sp}\bar{\rho}_L L_{\text{eff}})^2}{2}P_s(t)(P_p(t))^2 + \ldots\right]e^{-\alpha L} \tag{2}$$

The second line of (2) provides the sought after explanation to the Raman induced crosstalk, CSO, and CTB distortions in the near zero dispersion optical communication system when the time dependent pump and signal wave powers are represented by:

$$P_s(t) = P_{0s} + P_{ms}(t) \tag{3a}$$
$$= P_{0s} + P_{0s}m_s f_s(t) + CSO_s + CTB_s$$

$$P_p(t) = P_{0p} + P_{mp}(t) \tag{3b}$$
$$= P_{0p} + P_{0p}m_p f_p(t) + CSO_p + CTB_p$$

Here $P_{0s}$, $P_{0p}$ are the average optical powers of the signal and pump waves, $P_{ms}(t)$, $P_{mp}(t)$ represent the explicitly time dependent terms of the optical powers, and $m_s$, $m_p$ are the respective optical modulation indices (OMI) for each laser. The third and fourth terms of the second lines in (3a) and (3b) represent the composite second order ($CSO_s$, $CSO_p$) and composite triple beat ($CTB_s$, $CTB_p$) distortions generated within the signal and pump optical transmitters themselves. The $CSO_s$ and $CSO_p$ distortions are native to the transmitters and are independent of the Raman interactions taking place in the fiber. The time dependent modulating functions $f_s(t)$ and $f_p(t)$ represented the information being carried on each optical wave. After substituting (3a) and (3b) into (2) and retaining only the most dominant terms one obtains:

$$P_s(t, L) = \tag{4}$$
$$P_{0s}[1 + G_{sp}\bar{\rho}_L L_{\text{eff}} P_{0p}]e^{-\alpha L} + P_{0s}m_s f_s(t)[1 + G_{sp}\bar{\rho}_L L_{\text{eff}} P_{0p}]e^{-\alpha L} +$$
$$G_{sp}\bar{\rho}_L L_{\text{eff}} P_{0s}(P_{0p}m_p f_p(t))e^{-\alpha L} +$$
$$CSO_s[1 + G_{sp}\bar{\rho}_L L_{\text{eff}} P_{0p}]e^{-\alpha L} + G_{sp}\bar{\rho}_L L_{\text{eff}} P_{0s} CSO_p e^{-\alpha L} +$$
$$G_{sp}\bar{\rho}_L L_{\text{eff}}[P_{0s}m_s f_s(t)][P_{0p}m_p f_p(t)]e^{-\alpha L} +$$
$$CTB_s[1 + G_{sp}\bar{\rho}_L L_{\text{eff}} P_{0p}]e^{-\alpha L} + G_{sp}\bar{\rho}_L L_{\text{eff}} P_{0s} CTB_p e^{-\alpha L} +$$
$$\frac{(G_{sp}\bar{\rho}_L L_{\text{eff}})^2}{2}[P_{0s}m_s f_s(t)][P_{0p}m_p f_p(t)]^2 e^{-\alpha L}$$

The second line of (4) contains the undistorted signal transmitter's RF subcarrier modulation multiplied by the Raman gain term ($1+G_{sp}\bar{\rho}_L L_{\text{eff}} P_{0p}$) and an additional first order RF subcarrier term arising from the modulated pump laser. This additional first order term is RF subcarrier crosstalk, a direct transfer of the pump laser's RF subcarrier modulation ($P_{0p}m_p f_p(t)$) to the signal carrier scaled by the Raman factor $G_{sp}\bar{\rho}_L L_{\text{eff}} P_{0s}$. When the RF subcarrier crosstalk is exactly in phase the signals constructively add (plus sign) while if they are exactly out of phase they destructively interfere (minus sign), all other phasing possibilities fall between these two extremes. The first terms of the third and fourth lines are the signal laser's generated $CSO_s$ and $CTB_s$ terms each multiplied by the same Raman gain term as the signal laser's RF subcarrier modulation. The second terms of the third and fourth lines are respectively the direct transfer of the pump laser's $CSO_p$ and $CTB_p$ distortions (distortion crosstalk) to the signal wave scaled by the same Raman factor as the RF subcarrier crosstalk that is transferred from the pump wave to the signal wave. The third terms of the third and fourth lines are the new Raman generated $CSO_R$ and $CTB_R$ distortions resulting from the product of the signal and pump lasers' RF subcarrier modulations. Collectively, the RF subcarrier crosstalk term, along with the second and third terms of the third and fourth lines constitute degraded performance of the signal transmitter due to the Raman interactions between the modulated pump and signal lasers. These will be denoted collectively as the Raman induced distortions. If the pump and signal lasers' modulations are not in phase with one another interference can also result between the various terms within each line of (4). It is the purpose of this invention to elucidate the methods and apparatus that can be utilized to reduce the deleterious effects of the Raman induced RF subcarrier crosstalk and CSO distortion terms. The Raman induced CTB is insignificant in magnitude and not treated here. When there are three or more lasers in the system (4) must be modified to account for the multiple pumps. For a system with n transmitters (4) becomes:

$$P_s(t, L) = P_{0s}\left(1 + L_{eff}\sum_{p=1}^{n} H_{s,p}G_{s,p}\bar{P}_{Ls,p}P_{0p}\right)e^{-\alpha L} + \quad (5)$$

$$\left[P_{0s}m_sf_s(t)\left(1 + L_{eff}\sum_{p=1}^{n} H_{s,p}G_{s,p}\bar{P}_{Ls,p}P_{0p}\right) + \right.$$

$$\left. P_{0s}L_{eff}\sum_{p=1}^{n} H_{s,p}P_{0p}m_pf_p(t)G_{s,p}\bar{P}_{Ls,p}\right]e^{-\alpha L}$$

$$\left[CSO_s\left(1 + L_{eff}\sum_{p=1}^{n} H_{s,p}G_{sp}\bar{P}_L P_{0p}\right) + P_{0s}L_{eff}\sum_{p=1}^{n} H_{s,p}G_{s,p}\bar{P}_{Ls,p}CSO_p + \right.$$

$$\left. P_{0s}m_sf_s(t)L_{eff}\sum_{p=1}^{n} H_{s,p}G_{s,p}\bar{P}_{Ls,p}P_{0p}m_pf_p(t)\right]e^{-\alpha L}$$

$$\left[CTB_s\left(1 + L_{eff}\sum_{p=1}^{n} H_{s,p}G_{s,p}\bar{P}_{Ls,p}P_{0p}\right) + P_{0s}L_{eff}\sum_{p=1}^{n} H_{s,p}G_{s,p}\bar{P}_{Ls,p}CTB_p + \right.$$

$$\left. P_{0s}m_sf_s(t)\frac{(L_{eff})^2}{2}\left[\sum_{p=1}^{n} H_{s,p}G_{s,p}\bar{P}_{Ls,p}P_{0p}m_pf_p(t)\right]^2\right]e^{-\alpha L}$$

The summations in (5) are over the parameters of the "n" transmitters in the system. It is important to note that equations (1) through (5) are to be interpreted as being in the optical domain. Therefore the powers in these equations, including the distortions ($CSO_s$, $CSO_p$, $CTB_s$, and $CTB_p$) are optical powers and not electrical (or RF) power levels.

The Raman induced crosstalk and nonlinear distortions are more pronounced when the wavelengths are located near the zero dispersion wavelength of the optical transmission media through which the signals are co-propagating (i.e. the optical fiber). In the case of a near zero dispersion system the optical pump and signal waves are propagating at nearly identical group velocities through the media. The zero dispersion wavelength of a transmission media refers to the wavelength at which an optical signal will have no change in (inverse) group velocity with respect to changes in its optical frequency. The zero dispersion wavelength differs for different transmission media. In this case, the relative positions of the waves with respect to one another will remain nearly fixed throughout the length of the transmission media. Thus, if the signals $S_i$ and $S_j$ are at or near the zero dispersion wavelength, they will largely maintain their relative phase with respect to one another. Hence, with very little walk off occurring between the optical channels the Raman induced crosstalk and distortions can build up along the fiber in a constructive manner. The dispersion will generally increase as the wavelength difference between the optical signal and the zero dispersion wavelength increases. If the signals $S_i$ and $S_j$ are located at wavelengths far displaced from the zero dispersion wavelength, their relative phases will change as they propagate down the transmission path. The levels of Raman induced crosstalk and distortions are much lower in the nonzero dispersion scenario because, as the signals walk away from one another, it becomes more difficult for the crosstalk and distortions to build up constructively along the fiber length.

Accordingly, it is desirable to have a method and apparatus for reducing the levels of Raman induced crosstalk and distortions that arises among the individual channels comprising a WDM optical system. This is particularly true in the case of a system utilizing optical channels that are located near the zero dispersion wavelength of the transmission medium.

SUMMARY OF THE INVENTION

A method and apparatus is provided for transmitting a WDM optical signal. The method begins by modulating a plurality of optical channels that are each located at a different wavelength from one another with a respective one of a plurality of information-bearing broadcast signals that all embody the same broadcast information, at least one of the broadcast signals being out of phase with respect to remaining ones of the plurality of broadcast signals. Each of the modulated optical channels are multiplexed to form a WDM optical signal. The WDM optical signal is forwarded onto an optical transmission path.

In accordance with one aspect of the invention, a phase shift of 180 degrees may be applied to at least one of the plurality of broadcast signals relative to the remaining ones of the plurality of broadcast signals.

In accordance with another aspect of the invention, a phase shift may be applied to selected ones of the plurality of broadcast signals so that the optical channels modulated thereby have contributions to Raman crosstalk at a selected one of the optical channels that are diminished by contributions to Raman crosstalk from optical channels modulated by RF signals that do not undergo a phase shift.

In accordance with another aspect of the invention, a phase shift may be applied to selected ones of the plurality of broadcast signals so that first and second broadcast signals modulate optical channels at first and second optical wavelengths, respectively, such that Raman crosstalk and induced distortions are reduced at a third optical channel.

In accordance with another aspect of the invention, a narrowcast signal may be combined with each broadcast signal prior to modulating.

In accordance with another aspect of the invention, a difference in wavelength between any of the optical channels may be less than the maximum power transfer Stokes shift in the optical transmission path.

In accordance with another aspect of the invention, the relative amplitudes of the first, second and third modulated optical channels may be adjusted to further reduce the Raman crosstalk.

In accordance with another aspect of the invention, the relative laser polarization of the first, second and third modulated optical channels may be adjusted to further reduce the Raman crosstalk.

In accordance with another aspect of the invention, the optical transmission path may be a HFC network.

In accordance with another aspect of the invention, the optical transmission path may be located in a CATV transmission network.

In accordance with another aspect of the invention, the optical transmission path may be located in a PON.

In accordance with another aspect of the invention, the optical channels may be located at wavelengths at or near a zero dispersion wavelength of the transmission path.

In accordance with another aspect of the invention, the optical channels are located at wavelengths remote from a zero dispersion wavelength of the transmission path but dispersion impact is not significant.

In accordance with another aspect of the invention, WDM optical transmitters are provided. Each transmitter may include one of a plurality of optical sources for generating optical channels located at different wavelengths; a plurality of optical modulators each having an input for receiving a respective one of a plurality of information-bearing broadcast signals that all embody the same broadcast information, each optical modulator being associated with a respective one of the plurality of optical sources to thereby provide a plurality of modulated optical channels; a phase shifter for adjusting a phase of at least one of the plurality of broadcast signals so that it is out of phase relative to another of the plurality of broadcast signals; and a multiplexer coupled to the plurality of optical sources to receive and combine the modulated optical channels to produce a multiplexed optical signal.

DETAILED DESCRIPTION

Figure 1:
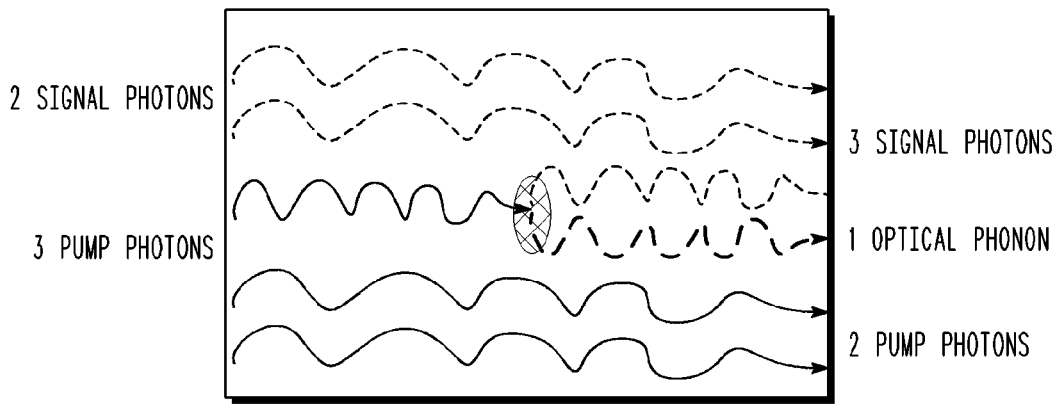
FIG. 1 is a schematic diagram illustrating the stimulated Raman scattering process.

Equations (4) and (5) presented above are the starting points in the discussion on eliminating the undesired Raman induced crosstalk and distortions that occur in a near zero dispersion optical communication system. Suppose that a constant phase shift can be applied to the composite RF subcarrier modulation applied to each transmitter. This can be accomplished by means of a broadband phase shifter such as a transformer based all pass filter that has a constant phase shift across the RF band of the subcarriers. The composite modulation signal feeding each transmitter is run though such a phase shifter specifically tailored for each laser with a specified phase. For the two wavelength system if a phase shift of $\phi_s$ is applied to the signal laser and phase shift of $\phi_p$ is applied to the pump laser equation (4) is then modified to the following in the frequency domain:

$$P_s(f, L) = P_{0s}[1 + G_{sp}\bar{P}_L L_{eff} P_{0p}]e^{-\alpha L} + \qquad (6)$$
$$P_{0s}m_s e^{i\varphi_s}\Im[f_s(t)]^+[1 + G_{sp}\bar{P}_L L_{eff} P_{0p}]e^{-\alpha L} +$$
$$G_{sp}\bar{P}_L L_{eff} P_{0s}(P_{0p}m_p e^{i\varphi_p}\Im[f_p(t)])e^{-\alpha L} +$$
$$(\hat{N}'_{\Delta CSOeff} + e^{i2\varphi_s}\hat{N}'_{\Sigma CSOeff})\frac{\pi}{2}K_{CSO_s}(P_{0s}m_s)^2[1 +$$
$$G_{sp}\bar{P}_L L_{eff} P_{0p}]e^{-\alpha L} + (\hat{N}'_{\Delta CSOeff} +$$
$$e^{i2\varphi_p}\hat{N}'_{\Sigma CSOeff})\frac{\pi}{2}K_{CSO_p}(P_{0p}m_p)^2 G_{sp}\bar{P}_L L_{eff} P_{0s} e^{-\alpha L} +$$
$$[e^{i(\varphi_s-\varphi_p)}\hat{N}'_{\Delta CSOeff} + e^{i(\varphi_s+\varphi_p)}\hat{N}'_{\Sigma CSOeff}]\frac{\pi}{2}G_{sp}\bar{P}_L L_{eff} P_{0s} m_s P_{0p} e^{-\alpha L} +$$
$$(e^{i2\varphi_s}3\hat{N}'_{\Delta CTBeff} + e^{i3\varphi_s}\hat{N}'_{\Sigma CTBeff})\frac{\pi}{4}K_{CSO_s}(P_{0s}m_s)^3[1 +$$
$$G_{sp}\bar{P}_L L_{eff} P_{0p}]e^{-\alpha L} + (e^{i2\varphi_p}3\hat{N}'_{\Delta CTBeff} +$$
$$e^{i3\varphi_s}\hat{N}'_{\Sigma CTBeff})\frac{\pi}{4}K_{CSO_p}(P_{0p}m_p)^3 G_{sp}\bar{P}_L L_{eff} P_{0s} e^{-\alpha L} +$$
$$[3e^{i\varphi_s}\hat{N}'_{\Delta CTBeff} + e^{i(\varphi+2\varphi_p)}\hat{N}_{\Sigma CTBeff}]\frac{\pi}{4}\frac{(G_{sp}\bar{P}_L L_{eff})^2}{2}P_{0s}m_s(P_{0p}m_p)^2 e^{-\alpha L} + c.c.$$

Where C.C. means complex conjugate and $\Im[f_s(t)]^+$ is the positive frequency portion of the Fourier transform of the RF subcarrier modulation signals. Also the parameters $K_{CSOs}$, $K_{CSOp}$, $K_{CTBs}$, and $K_{CTBp}$ are given by:

$$K'_{CSOs} = \frac{2}{m_s P_{0s} N_{CSOeff} \sqrt{r_{CSO_s}^{electrical}}} \qquad (7a)$$

$$K'_{CSO_p} = \frac{2}{m_p P_{0p} N'_{CSOeff} \sqrt{r_{CSO_p}^{electrical}}} \quad (7b)$$

$$K'_{CTB_s} = \frac{4}{(m_s P_{0s})^2 N'_{CTBeff} \sqrt{r_{CTB_s}^{electrical}}} \quad (7c)$$

$$K'_{CTB_p} = \frac{4}{(m_p P_{0p})^2 N'_{CTBeff} \sqrt{r_{CTB_p}^{electrical}}} \quad (7d)$$

Where $r_{CSO_s}^{electrical}$ and $r_{CSO_p}^{electrical}$ are the native CSO ratios of the signal and pump transmitters in electrical units. Also $r_{CTB_s}^{electrical}$ and $r_{CTB_p}^{electrical}$ are the native CTB ratios of the signal and pump transmitters in electrical units. $N'_{CSOeff}$ is the effective beat count (after taking into consideration the random phasing of the RF subcarriers) at a specific CSO frequency. $N'_{CTBeff}$ is the effective beat count (after taking into consideration the random phasing of the RF subcarriers) at a specific CSO frequency.

For a multi wavelength system if a phase shift of $\phi_s$ is applied to the laser under investigation and phase shifts of $\phi_p$ are applied to the other lasers equation (5) is then modified to the following in the frequency domain (ignoring the third order CTB terms which are insignificant):

$$P_s(f, L) = P_{0s} e^{-\alpha L} \left[ 1 + L_{eff} \sum_{p=1}^{n} H_{s,p} G_{s,p} \bar{\rho}_{Ls,p} P_{0p} \right] +$$

$$P_{0s} m_s e^{i\varphi_s} \Im[f(t)]^+ e^{-\alpha L} \left[ 1 + L_{eff} \sum_{p=1}^{n} H_{s,p} G_{s,p} \bar{\rho}_{Ls,p} P_{0p} \right] +$$

$$e^{-\alpha L} L_{eff} P_{0s} \Im[f(t)]^+ \sum_{p=1}^{n} H_{s,p} G_{s,p} \bar{\rho}_{Ls,p} P_{0p} m_p e^{i\varphi_p} +$$

$$[\hat{N}'_{\Delta CSOeff} + e^{i2\varphi_s} \hat{N}'_{\Sigma CSOeff}] \left[ 1 + L_{eff} \sum_{p=1}^{n} H_{s,p} G_{s,p} \bar{\rho}_{Ls,p} P_{0p} \right] \frac{\pi}{2} K_{CSO_s} (P_{0s} m_s)^2 e^{-\alpha L} +$$

$$\left[ \hat{N}'_{\Delta CSOeff} \sum_{p=1}^{n} K_{CSO_p} H_{s,p} G_{s,p} \bar{\rho}_{Ls,p} (P_{0p} m_p)^2 + \right.$$

$$\left. \hat{N}'_{\Sigma CSOeff} \sum_{p=1}^{n} K_{CSO_p} H_{s,p} G_{s,p} \bar{\rho}_{Ls,p} (P_{0p} m_p)^2 e^{i2\varphi_p} \right] P_{0s} L_{eff} \frac{\pi}{2} e^{-\alpha L} +$$

$$\left[ \hat{N}'_{\Delta CSOeff} \sum_{p=1}^{n} H_{s,p} G_{s,p} \bar{\rho}_{Ls,p} P_{0p} m_p e^{-i\varphi_p} + \right.$$

$$\left. \hat{N}'_{\Sigma CSOeff} \sum_{p=1}^{n} H_{s,p} G_{s,p} \bar{\rho}_{Ls,p} P_{0p} m_p e^{i\varphi_p} \right] P_{0s} m_s L_{eff} e^{i\varphs} \frac{\pi}{2} e^{-\alpha L} + c.c.$$

$$(8)$$

There are n of these equations, one for each of the transmitted wavelengths in the system, so that (8) is actually a matrix equation for each of the impairments. Note that the Raman gain is zero when the optical frequency separation between the signals goes to zero we have then for the s=p terms of (8) (the diagonal elements of the matrix equation:

$$P_s(f, L) = P_{0s} e^{-\alpha L} + P_{0s} m_s e^{i\varphi_s} \Im[f(t)]^+ e^{-\alpha L} + \quad (9)$$

$$[\hat{N}'_{\Delta CSOeff} + e^{i2\varphi_s} \hat{N}'_{\Sigma CSOeff}] \frac{\pi}{2} K_{CSO_s} (P_{0s} m_s)^2 e^{-\alpha L}$$

This is just the original signal including the native $CSO_s$ term uninfluenced by the Raman interactions.

To understand how to eliminate the impairments each particular impairment must be set equal to zero by extracting the appropriate terms from either (6) or (8).

For the crosstalk in the two wavelength system this leads to the following equation:

$$G_{sp} \bar{\rho}_L L_{eff} P_{0s} P_{0p} m_s e^{i\varphi_s} + G_{sp} \bar{\rho}_L L_{eff} P_{0s} P_{0p} m_p e^{i\varphi_p} = 0 \quad (10)$$

Which leads to the following conclusions:

The Raman induced crosstalk in a two wavelength, near zero dispersion system, can only be eliminated if the transmitters have identical OMI's ($m_p = m_s$) and the modulations are out of phase by $\pi$ radians or if the length averaged polarization overlap $\bar{\rho}_L$ is zero. The polarization condition can only be approximately satisfied by launching the pump and signal transmitters in orthogonal polarization states. In this case $\bar{\rho}_L$ would start out at zero and gradually drift towards the value of ½ as the signals co-propagate down the length of the fiber. The longer the fiber the closer the value of $\rho_L$ will be to ½ at the end of the link. Therefore the polarization method alone is less effective in longer fiber links.

Considering the CSO terms in the two wavelength system, equation (6) leads to two equations one for the difference beats and one for the sum beats. Denoting the total power in the CSO due to the difference beats as $P_{\Delta CSOtotal}$ and the total CSO power due to the sum beats as $P_{\Sigma CSOtotal}$ then the CSO terms in (6) give:

$$P_{\Delta CSOtotal} = \qquad (11)$$
$$\hat{N}'_{\Delta CSOeff} \frac{\pi}{2} e^{-\alpha L} \{ K_{CSO_s}(P_{0s}m_s)^2 + K_{CSO_s}(P_{0s}m_s)^2 G_{sp}\bar{\rho}_L L_{eff} P_{0p} +$$
$$K_{CSO_p}(P_{0p}m_p)^2 G_{sp}\bar{\rho}_L L_{eff} P_{0s} +$$
$$e^{i(\varphi_s - \varphi_p)} G_{sp}\bar{\rho}_L L_{eff} P_{0s} m_s P_{0p} m_p \} + c.c.$$

$$P_{\Sigma CSO\,total} = \qquad (12)$$
$$\hat{N}'_{\Sigma CSOeff} \frac{\pi}{2} e^{-\alpha L} \{ e^{i2\varphi_s} K_{CSO_s}(P_{0s}m_s)^2 + e^{i2\varphi_s} K_{CSO_s}(P_{0s}m_s)^2 G_{sp}$$
$$\bar{\rho}_L L_{eff} P_{0p} + e^{i2\varphi_p} K_{CSO_p}(P_{0p}m_p)^2 G_{sp}\bar{\rho}_L L_{eff} P_{0s} +$$
$$e^{i(\varphi_s + \varphi_p)} G_{sp}\bar{\rho}_L L_{eff} P_{0s} m_s P_{0p} m_p \} + c.c.$$

These equations, when set equal to zero, lead to following the phasing requirements in order to reduce the CSO levels in a two wavelength system:

$$\phi_s = 2n\pi \text{ and } \phi_p = \pi \text{ where n is an integer} \qquad (13)$$

With these phase requirements satisfied (11) and (12) both reduce to the same equation. Solving for the optimal value of the product $\bar{\rho}_L P_{0p}$ gives:

$$\bar{\rho}_L P_{0p} = -\frac{1}{G_{sp}L_{eff}} \left( \frac{1}{1 + \frac{m_p \sqrt{r^{electrical}_{CSOs}}}{m_s \sqrt{r^{electrical}_{CSOp}}} - \frac{1}{2} m_p N'_{CSOeff} \sqrt{r^{electrical}_{CSOs}}} \right) \qquad (14)$$

To summarize, in order to reduce the effects of CSO distortions on two identically modulated lasers in a near zero dispersion system the modulation applied to the pump and signal transmitters should be out of phase by $\pi$ radians, and the product of the length averaged polarization overlap probability $\bar{\rho}_L$ and the pump launch power $P_{0p}$ should satisfy (14). If (14) indicates an optimal $\bar{\rho}_L$ value of 0.5, then this can be accomplished by launching one optical wave in a linear polarization state and the other in a circular polarization state. Equation (14) is only valid if (13) is also satisfied for the modulation phases applied to the transmitters. Notice that the phasing conditions for CSO reduction and crosstalk elimination are identical. The crosstalk elimination also imposes the requirement that $m_p = m_s$.

Next examining the methods of eliminating or reducing the crosstalk in a multi wavelength system. Equation (8) leads to the following matrix equation for the crosstalk on all wavelengths in the system:

$$x_s = P_{0s} m_s e^{i\varphi_s} \Im[f(t)]^+ e^{-\alpha L} L_{eff} \sum_{p=1}^{n} H_{s,p} G_{s,p} \bar{\rho}_{Ls,p} P_{0p} + \qquad (15)$$
$$e^{-\alpha L} L_{eff} P_{0s} \Im[f(t)]^+ \sum_{p=1}^{n} H_{s,p} G_{s,p} \bar{\rho}_{Ls,p} P_{0p} m_p e^{i\varphi_p}$$

In (15) $x_s$ is a placeholder to remind us that there are n such crosstalk equations that must be solved simultaneously (all of the $x_s$ are to be set equal to zero in order to cancel out the Raman crosstalk on each wavelength):

$$x_s = 0 = m_s e^{i\varphi_s} \sum_{p=1}^{n} H_{s,p} G_{s,p} \bar{\rho}_{Ls,p} P_{0p} + \sum_{p=1}^{n} H_{s,p} G_{s,p} \bar{\rho}_{Ls,p} P_{0p} m_p e^{i\varphi_p} \qquad (16)$$

This further reduces to:

$$x_s = 0 = \sum_{p=1}^{n} (m_s e^{i\varphi_s} + m_p e^{i\varphi_p}) H_{s,p} G_{s,p} \bar{\rho}_{Ls,p} P_{0p} \qquad (17a)$$

which can be put into the form:

$$x_s = 0 = \sum_{p=1}^{n} \left( 1 + \frac{m_p}{m_s} e^{i(\varphi_p - \varphi_s)} \right) H_{s,p} G_{s,p} \bar{\rho}_{Ls,p} P_{0p} \qquad (17b)$$

This is easily expressed as a matrix equation:

$$\begin{bmatrix} 0 \\ 0 \\ 0 \\ \vdots \\ 0 \end{bmatrix} = \begin{bmatrix} 0 & \gamma_{1,2} & \gamma_{1,3} & \cdots & \gamma_{1,n} \\ \gamma_{2,1} & 0 & \gamma_{2,3} & \cdots & \gamma_{2,n} \\ \gamma_{3,1} & \gamma_{3,2} & 0 & \cdots & \gamma_{3,n} \\ \vdots & \vdots & \vdots & \ddots & \vdots \\ \gamma_{n,1} & \gamma_{n,2} & \gamma_{n,3} & \cdots & 0 \end{bmatrix} \begin{bmatrix} P_{01} \\ P_{02} \\ P_{03} \\ \vdots \\ P_{0n} \end{bmatrix} \qquad (18)$$

where the elements of the n×n crosstalk interaction matrix are given by:

$$\gamma_{s,p} \equiv \left( 1 + \frac{m_p}{m_s} e^{i(\varphi_p - \varphi_s)} \right) H_{s,p} G_{s,p} \bar{\rho}_{Ls,p} \qquad (19)$$

Notice that the transpose elements are related by $$\gamma_{s,p} \equiv \left( 1 + \frac{m_p}{m_s} e^{i(\varphi_p - \varphi_s)} \right) H_{s,p} G_{s,p} \bar{\rho}_{Ls,p} \qquad (20a)$$

$$\gamma_{p,s} \equiv \left( 1 + \frac{m_s}{m_p} e^{i(\varphi_s - \varphi_p)} \right) H_{p,s} G_{s,p} \bar{\rho}_{Ls,p} \qquad (20b)$$

So that if $m_p = m_s$ and for $\lambda_s > \lambda_p$ then:

$$\gamma_{s,p} \equiv (1 + e^{i(\phi_p - \phi_s)}) G_{s,p} \bar{\rho}_{Ls,p} \qquad (20c)$$

$$\gamma_{p,s} = -\frac{\tilde{n}_s \lambda_s}{\tilde{n}_p \lambda_p} \left( 1 + e^{i(\varphi_s - \varphi_p)} \right) G_{s,p} \bar{\rho}_{Ls,p} = -\frac{\tilde{n}_s \lambda_s}{\tilde{n}_p \lambda_p} \gamma^*_{s,p} \qquad (20d)$$

In most typical WDM optical communication systems the ratio of refractive indices and wavelengths is approximately equal to unity:

$$\frac{\tilde{n}_s \lambda_s}{\tilde{n}_p \lambda_p} \approx 1 \quad (20e)$$

The only way that (18) can be satisfied in a nontrivial way, under all conditions, is if each of the matrix elements is zero. This can happen if:

$\gamma_{s,p}=0$ if $\phi_p-\phi_s=\pi$ and also $m_p=m_s$ or $\bar{\rho}_{Ls,p}=0$ (21)

Because polarization is a two dimensional Hilbert space, for any agreed upon basis, there will be exactly two orthogonal polarization states. All other polarization sates can be expressed as a linear combination of the chosen basis states. Furthermore, once any one of the modulation phases is fixed the modulation phase of any other signal, in the same polarization state, must be displaced by π radians. Therefore for any two states with the same polarization there are only two phases that will satisfy the first line of (21) ($\phi$, $\phi+\pi$). Essentially, then, there are only two orthogonal polarization states and two phases to choose from, the direct product of modulation-phase states and polarization then forms an effective 2×2 vector space in which there are four orthogonal states. If the two orthogonal modulation phase states are $|\phi\rangle$ and $|\phi+\pi\rangle$ and if the polarization basis states are denoted by $|//\rangle$ and $|\perp\rangle$, then the basis states of the newly formed 2×2 modulation-phase and polarization space are given by:

$|\phi,//\rangle_a, |\phi,\perp\rangle_b, |\phi+\pi,//\rangle_c, |\phi+\pi,\perp\rangle_d$ (22)

In other words, (18) can only be satisfied exactly for a system consisting of at most 4 independent optical transmitters (each with identical OMI values so that (21) is satisfied). These basis states will make all of the matrix elements in the 4×4 crosstalk interaction matrix zero. In (22) the subscripts a, b, c, d were added to help in identifying each of the basis vectors.

Within any set of four basis vectors the matrix elements $\gamma_{s,p}$ are all zero because one of the following must be true:

$G_{s,p}=0$ if $s=p$ (23a)

$\langle \phi_s | \phi_p \rangle = 0$ if $\phi_s = \phi_p + \pi$ (23b)

$|\langle Pol_s | Pol_p \rangle|^2 = 0$ if the two polarization states are orthogonal (23c)

Where $Pol_s$ and $Pol_p$ are just the polarization states of the $s^{th}$ and $p^{th}$ optical waves. Here it is implied that $|\langle Pol_s|Pol_p\rangle|^2$ is averaged over the fiber length so that $|\langle Pol_s|Pol_p\rangle|^2 = \bar{\rho}_{Ls,p}$.

The crosstalk is zero within the group of four orthogonal states. This method completely eliminates the Raman induced crosstalk along with the static Raman gain imparted upon the signal term.

Now suppose a system exists with more than 4 transmitters, it is impossible using the above method to completely eliminate the Raman generated crosstalk in the system. However, by simplifying the approach so that we explicitly treat only the Raman induced crosstalk and not the Raman gain on the signal under consideration we may significantly reduce the level of the Raman crosstalk. Taking this approach we ignore the first term in (16) so that we now have the following matrix elements:

$\gamma_{s,p}=m_p e^{i(\phi_p-\phi_s)} H_{s,p} G_{s,p} \bar{\rho}_{Ls,p}$ (24)

The transpose elements are related by $\gamma_{s,p}=m_p e^{i(\phi_p-\phi_s)} H_{s,p} G_{s,p} \bar{\rho}_{Ls,p}$ (25a)

$\gamma_{p,s}=m_s e^{i(\phi_s-\phi_p)} H_{s,p} G_{s,p} \bar{\rho}_{Ls,p}$ (26b)

So that for $\lambda_s > \lambda_p$ then:

$\gamma_{s,p}=m_p e^{i(\phi_p-\phi_s)} G_{s,p} \bar{\rho}_{Ls,p}$ (27a)

$\gamma_{p,s} \equiv -m_s \frac{\tilde{n}_s \lambda_s}{\tilde{n}_p \lambda_p} e^{i(\varphi_s-\varphi_p)} G_{s,p} \bar{\rho}_{Ls,p} = -\frac{m_s}{m_p} \frac{\tilde{n}_s \lambda_s}{\tilde{n}_p \lambda_p} \gamma_{s,p}^*$ (27b)

If we let $$\varepsilon_{s,p} \equiv \frac{m_p}{m_s} \frac{\tilde{n}_p \lambda_p}{\tilde{n}_s \lambda_s} \quad (28)$$

Then for $\lambda_1 < \lambda_2 \ldots < \lambda_{n-1} < \lambda_n$ under these simplifications (18) reduces to:

$$\begin{bmatrix} 0 \\ 0 \\ 0 \\ \vdots \\ 0 \end{bmatrix} = \begin{bmatrix} 0 & -\varepsilon_{1,2}\gamma_{2,1}^* & -\varepsilon_{1,3}\gamma_{3,1}^* & \cdots & -\varepsilon_{1,n}\gamma_{n,1}^* \\ \gamma_{2,1} & 0 & -\varepsilon_{2,3}\gamma_{3,2}^* & \cdots & -\varepsilon_{2,n}\gamma_{n,2}^* \\ \gamma_{3,1} & \gamma_{3,2} & 0 & \cdots & -\varepsilon_{3,n}\gamma_{n,3}^* \\ \vdots & \vdots & \vdots & \ddots & \vdots \\ \gamma_{n,1} & \gamma_{n,2} & \gamma_{n,3} & \cdots & 0 \end{bmatrix} \begin{bmatrix} P_{01} \\ P_{02} \\ P_{03} \\ \vdots \\ P_{0n} \end{bmatrix} \quad (29)$$

If the system is further restricted to have an odd number of wavelengths (n odd) then each row of the n×n Raman crosstalk interaction matrix contains an even number of nonzero elements. We may arrange the system so that the terms in the last row cancel out in pairs by assigning alternating phases as follows to the n wavelengths of the system:

$\phi_1=\phi_1, \phi_2=\phi_1+\pi, \phi_3=\phi_1 \ldots \phi_{n-1}=\phi_1+\pi, \phi_n=\phi_1$ (30a)

The simplest scheme is to let $\phi_1=0$ then the phases assigned to the n wavelengths alternate between 0 and π (180°) as:

$0_1, 180_2, 0_3, 180_4, 0_5, 180_6, \ldots, 0_n$ (30b)

Where the subscripts refer to the wavelength assigned the particular phase in the alternating series. The phases assigned to the corresponding wavelengths must alternate in this fashion in order to ensure maximum cancellation of the Raman induced crosstalk signals. This can easily be deduced in the case where the coefficients $\epsilon_{s,p}$ are all set equal to unity ($\epsilon_{s,p} \approx 1$) and the optical launch powers are arranged so that every term in each line of (29) has the same magnitude. In this case the phases will alternate by 180 degrees and because there are an even number of non zero terms in each line total cancellation of the Raman crosstalk is achieved.

In the actual case the coefficients $\epsilon_{s,p}$ will not all be equal to unity but they will be very close to one. Hence we conclude that under these conditions the crosstalk will nevertheless be minimized if not totally eliminated.

Now moving on to treat the Raman induced CSO in the case of a multiple wavelength system. The CSO terms are the last three lines of (8). We follow the procedure of the previous paragraphs and set the sum beat and difference beat terms equal to zero independently giving:

$$P_{\Delta CSOtotals} = \hat{N}'_{\Delta CSOeff} \frac{\pi}{2} P_{0s} m_s e^{-\alpha L} \left[ 1 + L_{eff} \sum_{p=1}^{n} H_{s,p} G_{s,p} \bar{\rho}_{Ls,p} P_{0p} \right] \frac{2}{N'_{CSOeff} \sqrt{r_{CSOs}^{electrical}}} + \quad (31a)$$

$$\hat{N}'_{\Delta CSOeff} \frac{\pi}{2} P_{0s} m_s e^{-\alpha L} \left[ \sum_{p=1}^{n} \frac{m_p}{m_s} \frac{2P_{0p}}{N'_{CSOeff} \sqrt{r_{CSOp}^{electrical}}} H_{s,p} G_{s,p} \bar{\rho}_{Ls,p} \right] L_{eff} +$$

$$\hat{N}'_{\Delta CSOeff} \frac{\pi}{2} P_{0s} m_s e^{-\alpha L} \left[ \sum_{p=1}^{n} H_{s,p} G_{s,p} \bar{\rho}_{Ls,p} P_{0p} m_p e^{-i\varphi_p} \right] L_{eff} e^{i\varphi_s} + C.C.$$

There are n of these equations, one for each of the transmitted wavelengths in the system, $$P_{\Sigma CSOtotals} = \quad (31b)$$

$$e^{i2\varphi_s} \hat{N}'_{\Sigma CSOeff} \frac{\pi}{2} P_{0s} m_s e^{-\alpha L} \left[ 1 + L_{eff} \sum_{p=1}^{n} H_{s,p} G_{s,p} \bar{\rho}_{Ls,p} P_{0p} \right] \frac{2}{N'_{CSOeff} \sqrt{r_{CSOs}^{electrical}}} +$$

$$\hat{N}'_{\Sigma CSOeff} \frac{\pi}{2} P_{0s} m_s e^{-\alpha L} \left[ \sum_{p=1}^{n} \frac{m_p}{m_s} \frac{2P_{0p}}{N'_{CSOeff} \sqrt{r_{CSOp}^{electrical}}} H_{s,p} G_{s,p} \bar{\rho}_{Ls,p} e^{i2\varphi_p} \right] L_{eff} +$$

$$\hat{N}'_{\Sigma CSOeff} \frac{\pi}{2} P_{0s} m_s e^{-\alpha L} \left[ \sum_{p=1}^{n} H_{s,p} G_{s,p} \bar{\rho}_{Ls,p} P_{0p} m_p e^{i\varphi_p} \right] L_{eff} e^{i\varphi_s} + C.C.$$

There are n of these equations, one for each of the transmitted wavelengths in the system. In (31a) and (31b), equations (7a) and (7b) were used to express the $K_{CSOs}$ and $K_{CSOp}$ constants in terms of the native CSO ratios of the signal and pump transmitters. Equations (31) are actually each n×n matrix equations. Setting each of these equations equal to zero gives:

$$0_{\Delta s} = \frac{1}{L_{eff} N'_{CSOeff} \sqrt{r_{CSOs}^{electrical}}} + \quad (32a)$$

$$\sum_{p=1}^{n} H_{s,p} G_{s,p} \bar{\rho}_{Ls,p} P_{0p} \left[ \frac{1}{N'_{CSOeff} \sqrt{r_{CSOs}^{electrical}}} + \frac{m_p}{m_s} \frac{1}{N'_{CSOeff} \sqrt{r_{CSOp}^{electrical}}} + \frac{m_p}{2} e^{i(\varphi_s - \varphi_p)} \right]$$

$$0_{\Sigma s} = \frac{2}{L_{eff} N'_{CSOeff} \sqrt{r_{CSOs}^{electrical}}} + \quad (32b)$$

$$\sum_{p=1}^{n} H_{s,p} G_{s,p} \bar{\rho}_{Ls,p} P_{0p} \left[ \frac{1}{N'_{CSOeff} \sqrt{r_{CSOs}^{electrical}}} + \frac{m_p}{m_s} \frac{1}{N'_{CSOeff} \sqrt{r_{CSOp}^{electrical}}} e^{i2(\varphi_p - \varphi_s)} + \frac{m_p}{2} e^{i(\varphi_p - \varphi_s)} \right]$$

Where $0_{\Delta s}$ and $0_{\Sigma s}$ are simply placeholder to remind us that there are n such equations to address. Each of these equations can be expressed in matrix form as:

$$\begin{bmatrix} 0 \\ 0 \\ 0 \\ \vdots \\ 0 \end{bmatrix} = \begin{bmatrix} \psi_1 \\ \psi_2 \\ \psi_3 \\ \vdots \\ \psi_n \end{bmatrix} + \begin{bmatrix} 0 & \Gamma_{1,2} & \Gamma_{1,3} & \cdots & \Gamma_{1,n} \\ \Gamma_{2,1} & 0 & \Gamma_{2,3} & \cdots & \Gamma_{2,n} \\ \Gamma_{3,1} & \Gamma_{3,2} & 0 & \cdots & \Gamma_{3,n} \\ \vdots & \vdots & \vdots & \ddots & \vdots \\ \Gamma_{n,1} & \Gamma_{n,2} & \Gamma_{n,3} & \cdots & 0 \end{bmatrix} \begin{bmatrix} P_{01} \\ P_{02} \\ P_{03} \\ \vdots \\ P_{0n} \end{bmatrix} \quad (33)$$

Where the various matrix elements are given by:

$$\psi_s \equiv \frac{1}{L_{eff} N'_{CSOeff} \sqrt{r_{CSOs}^{electrical}}} \quad (34)$$

For the difference beat equation (32a) the matrix elements $\Gamma_{s,p}$ are:

$$\Gamma_{s,p} \equiv H_{s,p} G_{s,p} \bar{\rho}_{Ls,p} \left[ \frac{1}{N'_{CSOeff} \sqrt{r_{CSOs}^{electrical}}} + \frac{m_p}{m_s} \frac{1}{N'_{CSOeff} \sqrt{r_{CSOp}^{electrical}}} + \frac{m_p}{2} e^{i(\varphi_s - \varphi_p)} \right] \quad (35a)$$

While for the sum beat equation (131b) the matrix elements $\Gamma_{s,p}$ are:

$$\Gamma_{s,p} \equiv H_{s,p} G_{s,p} \bar{\rho}_{Ls,p} \left[ \frac{1}{N'_{CSOeff} \sqrt{r^{electrical}_{CSOs}}} + \frac{m_p}{m_s} \frac{1}{N'_{CSOeff} \sqrt{r^{electrical}_{CSOp}}} e^{i2(\varphi_p - \varphi_s)} + \frac{m_p}{2} e^{i(\varphi_p - \varphi_s)} \right] \quad (35b)$$

The column vector of $\psi_s$ elements arises from the native CSO's of each transmitter in the system. The crosstalk equation (18) had no such column vector because there is not any "native crosstalk."

All of the purely real terms in (35a), (35b) as well as (34) are positive valued. If there is to be any possibility of canceling out the positive terms, in order to satisfy (33), the last term of (35a) and (35b) must be real and negative therefore we may impose the first constraint on the phase angles:

$$\phi_p - \phi_s = \pi \quad (36)$$

Similar to the case of crosstalk elimination, once any one of the modulation phases is fixed the modulation phase of any other signal must be displaced by $\pi$ radians. Therefore for any two states there are only two phases that will satisfy (36) ($\phi$, $\phi+\pi$). Essentially, then, there are only two modulation-phases to choose from. This can again be likened to a two dimensional Hilbert space with modulation-phase states $|\phi\rangle$ and $|\phi+\pi\rangle$. Unlike the crosstalk case, here we do not want the length averaged polarization overlap probabilities to be zero in all cases otherwise the $\Gamma_{s,p}$ matrix elements would all be zero and there would not be any chance of satisfying (33). Since we wish to maintain those terms which are out of phase with the $s^{th}$ state by $\pi$ radians we do not require orthogonal polarization states in general. However, for those states assigned the same modulation-phase as the $s^{th}$ state all of the terms of the matrix element $\Gamma_{s,p}$ will be positive and therefore these states cannot satisfy (33). These states should be in orthogonal polarization states with respect to the $s^{th}$ state under consideration, so that $\bar{\rho}_{Ls,p} \approx 0$ and the matrix elements will be zero. If we then require that the states with modulation-phase that are offset by $\pi$ radians to be in parallel polarization states $\bar{\rho}_{Ls,p} \approx 1$ so that these matrix elements dominate then we have once again defined a two dimensional polarization basis. Just as in the crosstalk discussion the direct product of modulation-phase states and polarization states then forms an effective 2×2 vector space in which there are four orthogonal states. If the two orthogonal modulation phase states are $|\phi\rangle$ and $|\phi+\pi\rangle$ and if the polarization basis states are denoted by $|//\rangle$ and $|\perp\rangle$, then the basis states of the newly formed 2×2 modulation-phase and polarization space are exactly the same as (22).

Also note that for those states in which (36) is satisfied that (35a) and (35b) both reduce to the same equation:

$$\Gamma_{s,p} \equiv H_{s,p} G_{s,p} \quad (37a)$$

$$\bar{\rho}_{Ls,p} \left[ \frac{1}{N'_{CSOeff} \sqrt{r^{electrical}_{CSOs}}} + \frac{m_p}{m_s} \frac{1}{N'_{CSOeff} \sqrt{r^{electrical}_{CSOp}}} - \frac{m_p}{2} \right]_{\bar{\rho}_{Ls,p} \approx 1}$$

For those states in which $\phi_s, \phi_p$ (35a) and (35b) both reduce to the same equation:

$$\Gamma_{s,p} \equiv H_{s,p} G_{s,p} \quad (37b)$$

$$\bar{\rho}_{Ls,p} \left[ \frac{1}{N'_{CSOeff} \sqrt{r^{electrical}_{CSOs}}} + \frac{m_p}{m_s} \frac{1}{N'_{CSOeff} \sqrt{r^{electrical}_{CSOp}}} - \frac{m_p}{2} \right]_{\bar{\rho}_{Ls,p} \approx 0}$$

We will require that $\bar{\rho}_{Ls,p} \approx 1$ (parallel polarizations) for (37a) and $\bar{\rho}_{Ls,p} \approx 0$ (orthogonal polarizations) for (37b).

Since the Hilbert space is just 4 dimensional (2×2 vector space) we can only satisfy the phase and polarization conditions exactly for the four orthogonal basis states given by (22).

Suppose we have the four states:

$$|\lambda_1, P_{01}, \phi, //\rangle, |\lambda_2, P_{02}, \phi, \perp\rangle, |\lambda_3, P_{03}, \phi+\pi, //\rangle, |\lambda_4, P_{04}, \phi+\pi, \perp\rangle \quad (38)$$

Then (33) reduces to the following:

$$(-1) \begin{bmatrix} \psi_1 \\ \psi_2 \\ \psi_3 \\ \psi_4 \end{bmatrix} = \begin{bmatrix} 0 & 0 & \Gamma_{1,3} & 0 \\ 0 & 0 & 0 & \Gamma_{2,4} \\ \Gamma_{3,1} & 0 & 0 & 0 \\ 0 & \Gamma_{4,2} & 0 & 0 \end{bmatrix} \begin{bmatrix} P_{01} \\ P_{02} \\ P_{03} \\ P_{04} \end{bmatrix} \quad (39)$$

The four equations are decoupled and can easily be solved. The solutions are identical to (14) with the polarization overlap probability set equal to one (since we have $\bar{\rho}_{Ls,p} \approx 1$).

$$P_{0p} = -\frac{1}{H_{s,p} G_{sp} L_{eff}} \left( \frac{1}{1 + \frac{m_p \sqrt{r^{electrical}_{CSOs}}}{m_p \sqrt{r^{electrical}_{CSOp}}}} - \frac{1}{2} m_p N'_{CSO\,eff} \sqrt{r^{electrical}_{CSOs}} \right) \quad (40)$$

In (14) there was some flexibility in adjusting the transmitted power because the value of $\bar{\rho}_L$ could be adjusted to compensate. In the four wavelength case the $\bar{\rho}_{Ls,p}$ each has a fixed value. Compared to the two wavelength case in which it was deemed desirable to set the polarization overlap probability equal to ½ here the non zero terms of (39) all have polarization overlap probabilities set equal to 1. Therefore, the launch powers for the four wavelength system will need to be half that of the two wavelength system launch power values for similar circumstances.

In (39) the diagonal terms are zero because $G_{p,p}=0$, the Raman gain is zero when the wavelengths are identical.

Evidently, it will be quite difficult to eliminate CSO distortions in the case of five or more wavelengths. For example, suppose there is an eight wavelength system with the following states:

$$|\lambda_1, P_{01}, \phi, //\rangle, |\lambda_2, P_{02}, \phi, \perp\rangle, |\lambda_3, P_{03}, \phi+\pi, //\rangle, |\lambda_4, P_{04}, \phi+\pi, \perp\rangle$$

$$|\lambda_5, P_{05}, \phi, //\rangle, |\lambda_6, P_{06}, \phi, \perp\rangle, |\lambda_7, P_{07}, \phi+\pi, //\rangle, |\lambda_8, P_{08}, \phi+\pi, \perp\rangle \quad (36)$$

Then (28) becomes $$(-1)\begin{bmatrix}\psi_1\\\psi_2\\\psi_3\\\psi_4\\\psi_5\\\psi_6\\\psi_7\\\psi_8\end{bmatrix}=\begin{bmatrix}0 & 0 & \Gamma_{1,3}^{(-)} & 0 & \Gamma_{1,5}^{(+)} & 0 & \Gamma_{1,7}^{(-)} & 0\\0 & 0 & 0 & \Gamma_{2,4}^{(-)} & 0 & \Gamma_{2,6}^{(+)} & 0 & \Gamma_{2,8}^{(-)}\\\Gamma_{3,1}^{(-)} & 0 & 0 & 0 & \Gamma_{3,5}^{(-)} & 0 & \Gamma_{3,7}^{(-)} & 0\\0 & \Gamma_{4,2}^{(-)} & 0 & 0 & 0 & \Gamma_{4,6}^{(-)} & 0 & \Gamma_{4,8}^{(+)}\\\Gamma_{5,1}^{(+)} & 0 & \Gamma_{5,3}^{(-)} & 0 & 0 & 0 & \Gamma_{5,7}^{(-)} & 0\\0 & \Gamma_{6,2}^{(+)} & 0 & \Gamma_{6,4}^{(-)} & 0 & 0 & 0 & \Gamma_{6,8}^{(-)}\\\Gamma_{7,1}^{(-)} & 0 & \Gamma_{7,3}^{(+)} & 0 & \Gamma_{7,5}^{(-)} & 0 & 0 & 0\\0 & \Gamma_{8,2}^{(-)} & 0 & \Gamma_{8,4}^{(+)} & 0 & \Gamma_{8,6}^{(-)} & 0 & 0\end{bmatrix}\begin{bmatrix}P_{01}\\P_{02}\\P_{03}\\P_{04}\\P_{05}\\P_{06}\\P_{07}\\P_{08}\end{bmatrix}\quad(37)$$

In (37) the superscripts (−) or (+) simply indicate whether the $m_p/2$ term in the matrix elements is negative or positive signed. Also notice that only even subscripts are paired together and only odd subscripts are paired together and that no even-odd pairing exists. Therefore (38) can be reduced to two 4×4 matrix equations:

$$(-1)\begin{bmatrix}\psi_1\\\psi_3\\\psi_5\\\psi_7\end{bmatrix}=\begin{bmatrix}0 & \Gamma_{1,3}^{(-)} & \Gamma_{1,5}^{(+)} & \Gamma_{1,7}^{(-)}\\\Gamma_{3,1}^{(-)} & 0 & \Gamma_{3,5}^{(-)} & \Gamma_{3,7}^{(-)}\\\Gamma_{5,1}^{(+)} & \Gamma_{5,3}^{(-)} & 0 & \Gamma_{5,7}^{(-)}\\\Gamma_{7,1}^{(-)} & \Gamma_{7,3}^{(+)} & \Gamma_{7,5}^{(-)} & 0\end{bmatrix}\begin{bmatrix}P_{01}\\P_{03}\\P_{05}\\P_{07}\end{bmatrix}\quad(38a)$$

$$(-1)\begin{bmatrix}\psi_2\\\psi_4\\\psi_6\\\psi_8\end{bmatrix}=\begin{bmatrix}0 & \Gamma_{2,4}^{(-)} & \Gamma_{2,6}^{(+)} & \Gamma_{2,8}^{(-)}\\\Gamma_{4,2}^{(-)} & 0 & \Gamma_{4,6}^{(-)} & \Gamma_{4,8}^{(+)}\\\Gamma_{6,2}^{(+)} & \Gamma_{6,4}^{(-)} & 0 & \Gamma_{6,8}^{(-)}\\\Gamma_{8,2}^{(-)} & \Gamma_{8,4}^{(+)} & \Gamma_{8,6}^{(-)} & 0\end{bmatrix}\begin{bmatrix}P_{02}\\P_{04}\\P_{06}\\P_{08}\end{bmatrix}\quad(38b)$$

Therefore the require launch powers are given by:

$$\begin{bmatrix}P_{01}\\P_{03}\\P_{05}\\P_{07}\end{bmatrix}=(-1)\begin{bmatrix}0 & \Gamma_{1,3}^{(-)} & \Gamma_{1,5}^{(+)} & \Gamma_{1,7}^{(-)}\\\Gamma_{3,1}^{(-)} & 0 & \Gamma_{3,5}^{(-)} & \Gamma_{3,7}^{(-)}\\\Gamma_{5,1}^{(+)} & \Gamma_{5,3}^{(-)} & 0 & \Gamma_{5,7}^{(-)}\\\Gamma_{7,1}^{(-)} & \Gamma_{7,3}^{(+)} & \Gamma_{7,5}^{(-)} & 0\end{bmatrix}^{-1}\begin{bmatrix}\psi_1\\\psi_3\\\psi_5\\\psi_7\end{bmatrix}\quad(39a)$$

and $$\begin{bmatrix}P_{02}\\P_{04}\\P_{06}\\P_{08}\end{bmatrix}=(-1)\begin{bmatrix}0 & \Gamma_{2,4}^{(-)} & \Gamma_{2,6}^{(+)} & \Gamma_{2,8}^{(-)}\\\Gamma_{4,2}^{(-)} & 0 & \Gamma_{4,6}^{(-)} & \Gamma_{4,8}^{(+)}\\\Gamma_{6,2}^{(+)} & \Gamma_{6,4}^{(-)} & 0 & \Gamma_{6,8}^{(-)}\\\Gamma_{8,2}^{(-)} & \Gamma_{8,4}^{(+)} & \Gamma_{8,6}^{(-)} & 0\end{bmatrix}^{-1}\begin{bmatrix}\psi_2\\\psi_4\\\psi_6\\\psi_8\end{bmatrix}\quad(39b)$$

In (38) and (39), when calculating the matrix elements using (32a) or (32b), all of the polarization overlap probabilities $\bar{\rho}_{Ls,p}$ are equal to one. Equations (39a) and (39b) can easily be solved using a computer based mathematical analysis program. The algorithm can be incorporated into a system controller that continuously adjusts the modulation-phase and polarization states of the transmitted optical waves to correct for changing environmental conditions that might upset the delicate balance of the parameters that are required to reduce or eliminate these impairments.

To summarize, it is possible to completely eliminate Raman induced crosstalk and CSO distortions for up to four identically modulated transmitters in a near zero chromatic dispersion optical communication system. For systems consisting of five or more optical channels neither impairment can be completely eliminated although the impairments can be reduced by judiciously assigning modulation-phase and polarization states to the transmitted waves. Now suppose a system exists with more than 4 transmitters, it is impossible using the above method to completely eliminate the Raman generated crosstalk in the system.

However, by simplifying the approach so that we explicitly treat only the Raman induced CSO and not the native CSO or Raman distortion crosstalk terms on the signal under consideration we may significantly reduce the level of the Raman induced CSO if not completely eliminate it. This can be accomplished quite easily by simply ignoring those terms in (32a) and (32b) which contain the native CSO factors $r^{CSOs electrical}$ or $r_{CSOp}^{electrical}$ Taking this approach we now have the following matrix equations:

$$0_{\Delta s}=\sum_{p=1}^{n}H_{s,p}G_{s,p}\bar{\rho}_{Ls,p}m_pe^{i(\varphi_s-\varphi_p)}P_{0p}\quad(40a)$$

$$0_{\Sigma s}=\sum_{p=1}^{n}H_{s,p}G_{s,p}\bar{\rho}_{Ls,p}m_pe^{i(\varphi_p-\varphi_s)}P_{0p}\quad(40b)$$

The matrix equation (33) reduces to:

$$\begin{bmatrix}0\\0\\0\\\vdots\\0\end{bmatrix}\begin{bmatrix}0 & \Gamma_{1,2} & \Gamma_{1,3} & \cdots & \Gamma_{1,n}\\\Gamma_{2,1} & 0 & \Gamma_{2,3} & \cdots & \Gamma_{2,n}\\\Gamma_{3,1} & \Gamma_{3,2} & 0 & \cdots & \Gamma_{3,n}\\\vdots & \vdots & \vdots & \ddots & \vdots\\\Gamma_{n,1} & \Gamma_{n,2} & \Gamma_{n,3} & \cdots & 0\end{bmatrix}\begin{bmatrix}P_{01}\\P_{02}\\P_{03}\\\vdots\\P_{0n}\end{bmatrix}\quad(41)$$

Where the matrix elements are, for the difference beat equation (40a):

$$\Gamma_{s,p}^{\Delta}=m_pe^{i(\phi_s-\phi_p)}H_{s,p}G_{s,p}\bar{\rho}_{Ls,p}\quad(42a)$$

And for the sum beat equations (40b):

$$\Gamma_{s,p}^{\Sigma}=m_pe^{i(\phi_p-\phi_s)}H_{s,p}G_{s,p}\bar{\rho}_{Ls,p}\quad(42b)$$

Notice that (41) for the Raman induced CSO has the exact same form as (18) for the Raman induced crosstalk. Furthermore, matrix elements (42a), for the difference CSO beat equation, are identical to the simplified Raman crosstalk matrix elements (24). The matrix elements for the sum beat equation are simply related to those of the difference beat equation by complex conjugation:

$$\Gamma_{s,p}^{\Sigma}=(\Gamma_{s,p}^{\Delta})^*\quad(43c)$$

Therefore, equations (41) and (18) are identical to one another when considering only the explicit Raman crosstalk or Raman induced CSO (the sum beat equation is simply the complex conjugate of the difference beat equation). Hence equations (24) through (30b), along with all of the discussions and conclusions surrounding them, apply equally well to the Raman induced CSO. In fact, we may simply replace the term "crosstalk" with "CSO" within those paragraphs. Thus the same criteria apply to effectively reducing the Raman induced CSO and Raman induced crosstalk. Namely by setting up the phasing criteria given by (30a) or (30b) and adjusting the OMI's and/or the powers to make each term in each line of (41) (and therefore (18)) have nearly equal magnitudes, then both the Raman induced CSO and Raman induced crosstalk impairments will be substantially reduced. How closely the magnitudes can be adjusted so that they are all equal to one another largely depends upon how close the each of the coefficients $\epsilon_{s,p}$ given by (28) comes to unity.

Figure 3:
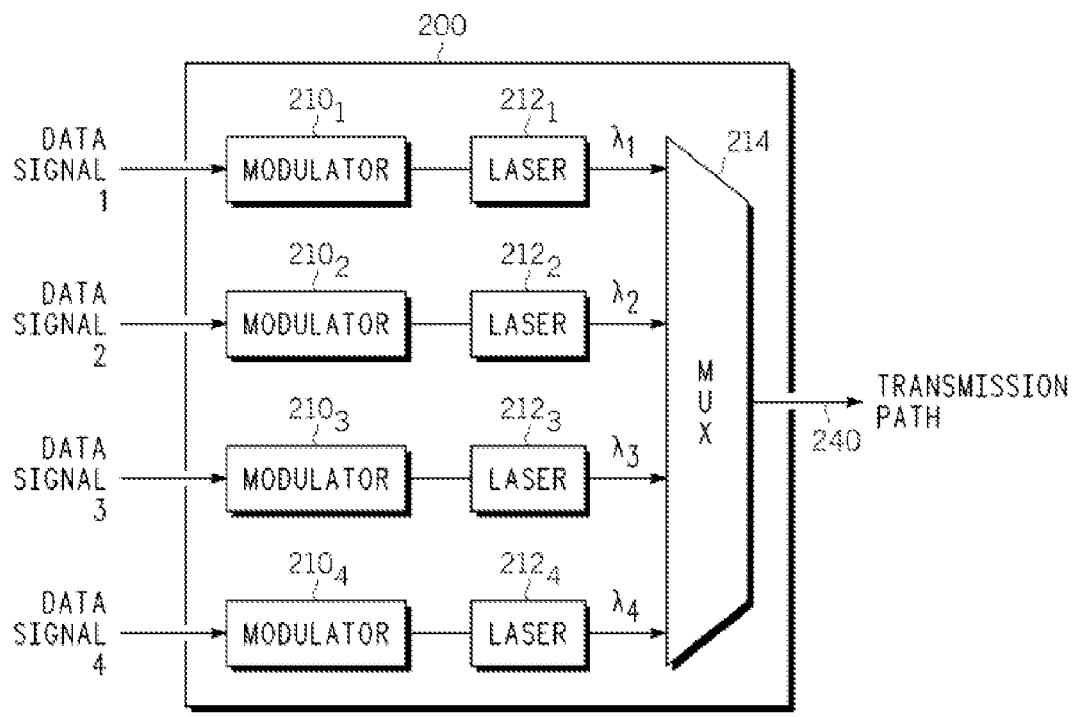
FIG. 3 shows a simplified block diagram of a conventional WDM transmission arrangement.

FIG. 3 shows a simplified block diagram of a conventional WDM transmission arrangement 200 in which data or other information-bearing signals $S_1$, $S_2$, $S_3$ and $S_4$ are respectively applied to the inputs of modulators $210_1$, $210_2$, $210_3$, and $210_4$. The modulators $210_1$, $210_2$, $210_3$, and $210_4$, in turn, drive lasers $212_1$, $212_2$, $212_3$, and $212_4$, respectively. The lasers $212_1$, $212_2$, $212_3$, and $212_4$ generate data modulated optical channels at wavelengths $\lambda_1$, $\lambda_2$, $\lambda_3$ and $\lambda_4$, respectively, where $\lambda_4 > \lambda_3 > \lambda_2 > \lambda_1$. A wavelength division multiplexer (WDM) 214 receives the optical channels and combines them to form a WDM optical signal that is then forwarded onto a single optical transmission path 240. While the WDM transmission arrangement shown in FIG. 3 multiplexes four optical channels onto a single path, those of ordinary skill in the art will recognize that any number of optical channels may be multiplexed in this manner.

Figures 2A, 2B, 2C:
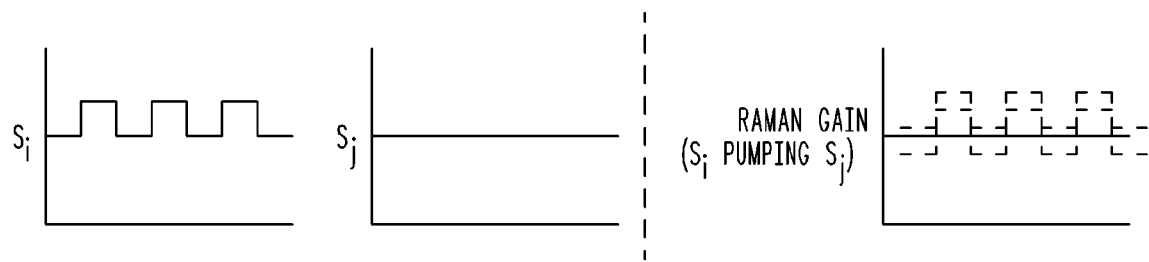
FIGS. 2A and 2B show signals $S_i$ and $S_j$, respectively.
FIG. 2C shows signal $S_i$ pumping signal $S_j$, for the purpose of facilitating an understanding of Raman crosstalk.
Figure 4:
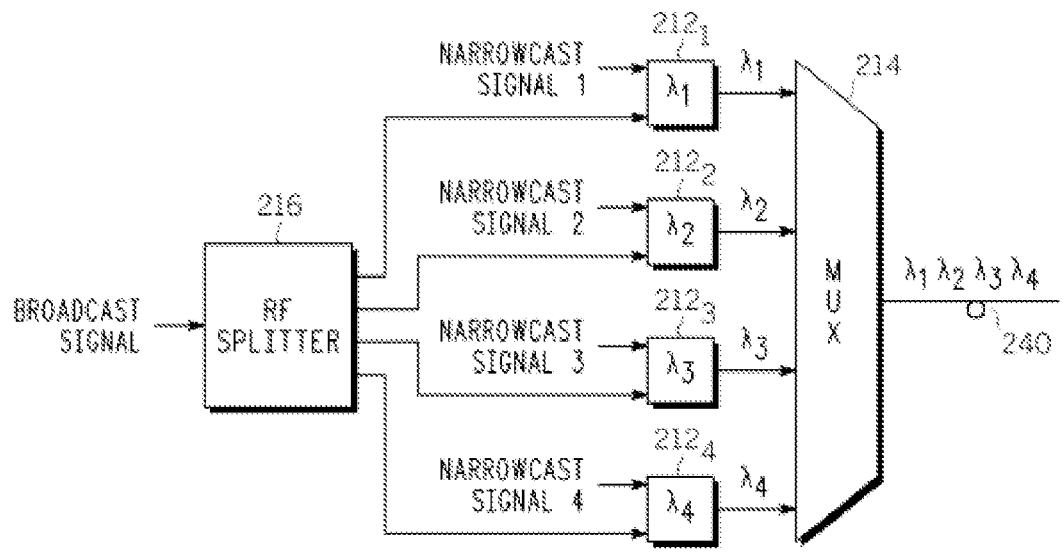
FIG. 4 illustrates a WDM system for common broadcast and different narrowcast transmissions in CATV transmission systems.

In the context of a CATV network, optical channels $\lambda_1$, $\lambda_2$, $\lambda_3$ and $\lambda_4$ may be broadcast signals that all contain the same video signals, plus narrowcast signals that are different for different optical channels of $\lambda_1$, $\lambda_2$, $\lambda_3$ and $\lambda_4$. Narrowcast signals that are RF frequency multiplexed into broadcast channels are normally much lower in amplitude than broadcast video signals. The arrangement of sending the same broadcast signal and different narrowcast signals over multiple wavelengths (WDM) is a means of providing more segmentation in CATV networks. This is demonstrated in FIG. 4, which shows an RF splitter 216 that splits the broadcast signal among the lasers $212_1$, $212_2$, $212_3$, and $212_4$. As shown, the lasers 212 each receive a different narrowcast signal. In FIGS. 2 and 3, like reference numerals denote like elements.

As previously noted, Raman crosstalk may occur among the optical channels $\lambda_1$, $\lambda_2$, $\lambda_3$ and $\lambda_4$. In the case of the CATV application scenarios as described the above, Raman crosstalk not only causes interference (crosstalk) between optical channels but signal distortions as well when the broadcast signals are sent over different WDM optical channels. Because the amplitude of broadcast video signals is much higher than that of narrowcast digital signal, Raman crosstalk has more impact on analog video signals between optical channels than on narrowcast channels. The present inventors have recognized that this problem can be overcome by adjusting the phase of the broadcast video channels in optical channels with respect to one another. Specifically, Raman crosstalk and the induced signal distortions can be reduced by shifting the phase of some of the signals by 180 degrees with respect to others of the signals. The particular channels that undergo this phase shift and the manner in which the phase shift is accomplished will depend on a number of factors such as the optical wavelengths employed, the channel spacing and the like. The following guidelines and examples that are discussed in connection with wavelengths $\lambda_1$-$\lambda_4$ shown above, are presented by way of illustration only and should not be construed as a limitation on the invention.

Figure 5:
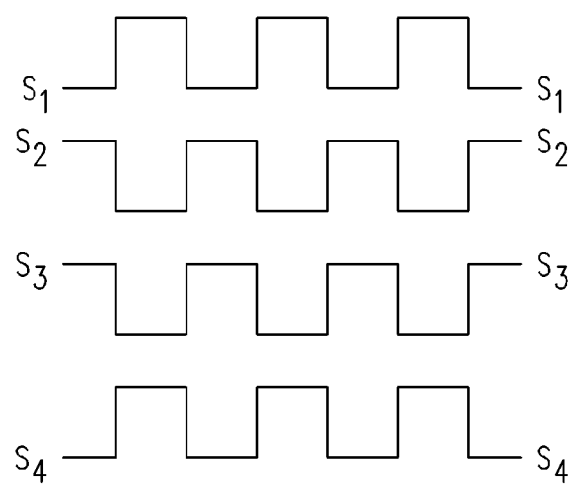
FIG. 5 shows WDM optical signals $S_1$, $S_2$, $S_3$ and $S_4$, with signals $S_2$ and $S_3$ selected to be 180 degrees out of phase with respect to signal $S_1$ and $S_4$.

FIG. 5 shows an illustrative example where the signals $S_1$, $S_2$, $S_3$ and $S_4$, with signals $S_2$ and $S_3$ selected to be 180 degrees out of phase with respect to signal $S_1$ and $S_4$. In this example a digital signal is used to represent the broadcast analog signal for simplicity. It should be noted that since the individual broadcast signals are identical, their patterns will all be the same prior to the phase shift. As a result of Raman amplification, signal $S_1$ will generate crosstalk at signal $S_4$. However, this crosstalk can be reduced or even canceled by the crosstalk generated by signals $S_2$ and $S_3$ at $S_4$. This can be accomplished if the amplitude of the crosstalk generated by $S_1$ equals the amplitude of the crosstalk generated by both $S_2$ and $S_3$. The relative amplitudes of $S_1$, $S_2$, and $S_3$ can be selected to ensure that this relationship among the three crosstalk components generated at $S_4$ is satisfied. Realizing the fact that when optical wavelengths are close to zero dispersion wavelengths or when the optical wavelengths are very close to each other, the phase relationship between optical channels is maintained for a certain length of transmission link, and therefore Raman crosstalk reduction is achieved effectively along the transmission link.

In a WDM signal, the wavelength spacing between adjacent ones of the channels $\lambda_1$, $\lambda_2$, $\lambda_3$ and $\lambda_4$ is generally much less than the maximum power transfer Stokes shift. Accordingly, in general, the greater the spacing between any two of the channels, the greater the Raman crosstalk between them. That is, the Raman crosstalk between signals $S_1$ and $S_4$ generally will be greater than the crosstalk between $S_2$ and $S_4$, which in turn generally will be greater than the crosstalk between $S_3$ and $S_4$. This explains why in the above example both signals $S_2$ and $S_3$ were selected to be 180 degrees out of phase with $S_1$: the two smaller components of the crosstalk at $S_4$ generated by $S_2$ and $S_3$ more readily cancel the larger component of the crosstalk generated by $S_1$ at $S_4$, thus requiring smaller adjustments to their relative amplitudes. Of course, those of ordinary skill in the art will recognize that the signals that are chosen to be out of phase from the other signals can be selected in any desired manner based on level of generated Raman crosstalk and relative dispersion relationship etc. For instance, in one example the signals may be pairwise out of phase (i.e., the even signals are in phase and the odd signals are out of phase). In the case of signals $\lambda_1$, $\lambda_2$, $\lambda_3$ and $\lambda_4$ shown above, for instance, signals $S_1$ and $S_3$ may be selected to be out of phase with signals $S_2$ and $S_4$. Of course, if the crosstalk is to be largely eliminated, this selection will typically require a greater adjustment to their relative amplitudes than the selection depicted in FIG. 5. It should be noted that reduction of Raman crosstalk through the above described technique reduces Raman induced signal distortions as well simultaneously. It should also be noted that the technique as explained above can be use in both CWDM and DWDM and therefore generally in any WDW.

As previously mentioned, Raman crosstalk can be particularly acute when the channels are located at wavelengths near the zero dispersion wavelength of the transmission path because the optical channels largely maintain their relative phases at these wavelengths. For the same reason, the aforementioned technique in which some of the channels are arranged to be out of phase with respect to other channels will be most effective when the channels are located near the zero dispersion wavelength of the transmission path. For instance, for channels operating in the 1310 nm window (typically defined as the waveband between about 1280 nm and 1330 nm), a commonly employed single mode optical fiber is the SMF-28™ fiber, available from Corning, Incorporated. The SMF-28 fiber has a zero dispersion wavelength at or near 1310 nm. Accordingly, if this transmission fiber is employed, Raman crosstalk can be most effectively reduced for optical channels having wavelengths in the vicinity of 1310 nm. Similarly, for optical wavelengths operating in the C-band (wavelengths between about 1525 to 1565 nm), a commonly available optical fiber is Corning's Leaf™ fiber, which has a zero dispersion wavelength near 1500 nm. For the Leaf™ fiber, the Raman crosstalk can be more effectively reduced for channels having wavelengths in the vicinity of 1500 nm than for channels in the vicinity of 1525 nm or 1565 nm. If, on the other hand, the optical wavelengths operate in the L-band (wavelengths between about 1565 to 1625 nm), a commonly available optical fiber is Corning's Leaf.R™ fiber, which has a zero dispersion wavelength near 1590 nm. For the Leaf.R™ fiber, the Raman crosstalk can be more effectively reduced for channels having wavelengths in the vicinity of 1590 nm than for channels in the vicinity of 1565 nm or 1625 nm. In the case where optical wavelengths in a WDM system are remote from the zero dispersion wavelength, closer wavelength spacing between WDM channels may be required or link length may be limited in order to maintain the relative phase between channels and therefore the effectiveness of this technique.

Figure 6:
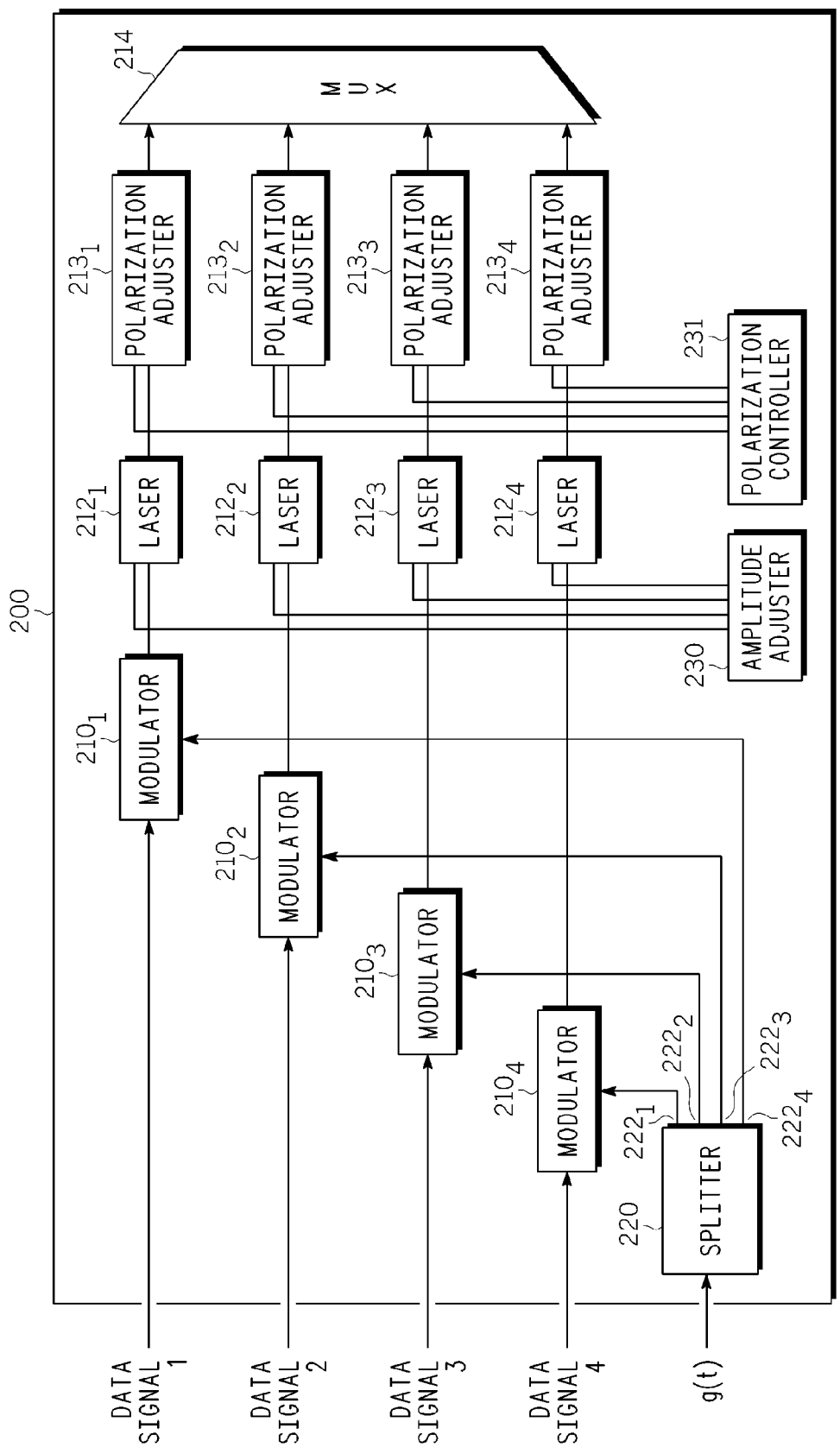
FIG. 6 shows one example of a transmitter arrangement in accordance with the present invention.

FIG. 6 shows one example of a transmitter arrangement in which select individual signals can be arranged to be out of phase with respect to other signals. In FIGS. 3 and 5 like elements are denoted by like reference numerals. As shown, an RF signal g(t) is applied to the input of a splitter 220. Splitter 220 has one output for each of the wavelengths that are to be multiplexed together by the transmitter arrangement. In the example shown in FIG. 5, the splitter has four outputs $222_1$, $222_2$, $222_3$ and $222_4$. Each output is directed to an input of one of the modulators. Specifically, output $222_1$ is directed to an input of modulator $212_4$, output $222_2$ is directed to an input of modulator $212_3$, output $222_3$ is directed to an input of modulator $212_2$, and output $222_4$ is directed to an input of modulator $212_1$. The modulators $210_1$, $210_2$, $210_3$, and $210_4$, in turn, drive lasers $212_1$, $212_2$, $212_3$, and $212_4$, respectively. The splitter 220 is configured so that select ones of its outputs shifts the phase of the input signal by 180 degrees. Such phase shifting splitters are well known components and do not need to be discussed in detail. Phase shifting can also be achieved separately. If the particular modulator pattern shown in FIG. 5 is employed, the outputs $222_2$ and $222_3$ of splitter 220 shift the RF signal g(t) by 180 degrees. An amplitude adjuster 230 may be provided for adjusting the relative amplitudes of the RF signals that modulate lasers, i.e. the modulation index, or of the optical signal output level generated by each of the lasers $212_1$, $212_2$, $212_3$, and $212_4$. Additionally, polarization adjusters $213_1$, $213_2$, $213_3$, and $213_4$ (under control of polarization controller 231) can be used to provide polarization control of the optical wavelengths can also be used to achieve a maximum reduction in crosstalk and distortion as depicted in FIG. 6. It should be noted that the data signals added to modulator $210_1$, $210_2$, $210_3$, and $210_4$, generally (though not always) include different narrowcast signals. In addition, while FIG. 6 shows direct modulators being employed, the techniques described herein can be applied to external modulators as well.

Figure 7:
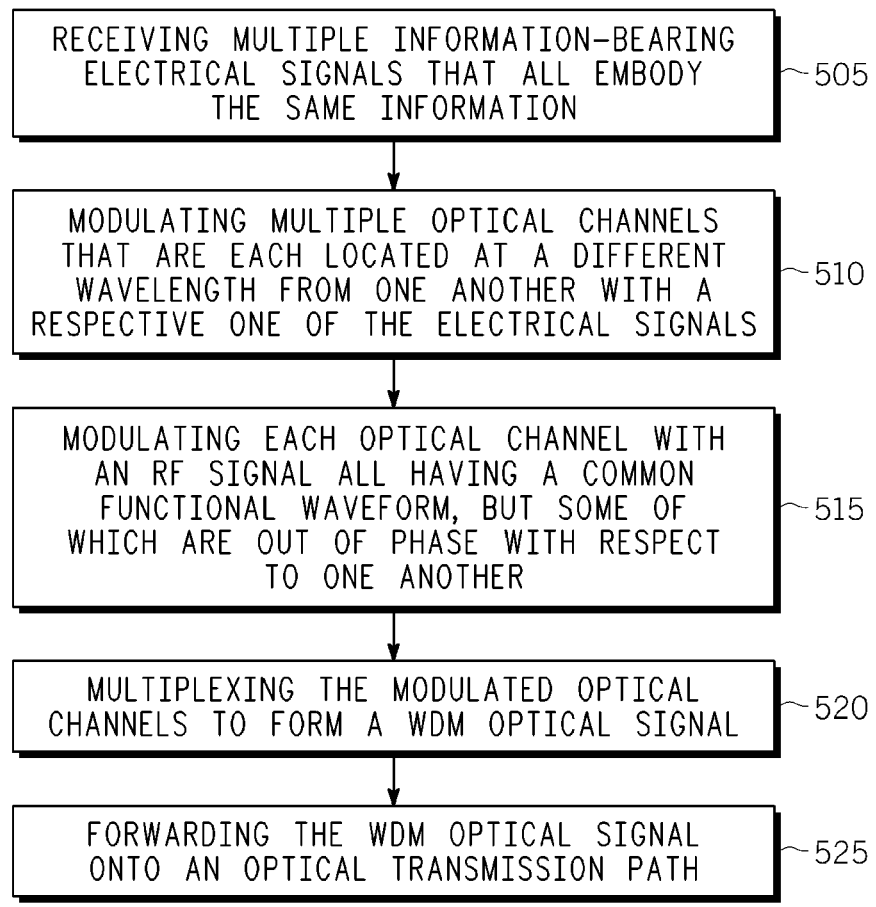
FIG. 7 is a flowchart showing one example of the method performed by the transmitter arrangement depicted in FIG. 5.

FIG. 7 is a flowchart showing one example of the method performed by the transmitter arrangement depicted in FIG. 6. The method begins in step 505 by receiving multiple information-bearing electrical signals that all embody the same broadcast information. The electrical signals may, for example, embody audio and/or video broadcast programming. Next, in step 510, multiple optical channels that are each located at a different wavelength from one another are modulated with a respective one of the electrical signals. In addition, in step 515 each optical channel is modulated with an RF signal. The RF signals all have a common functional broadcast waveform. At least one of the RF signals is out of phase with respect to remaining ones of the plurality of RF signals. The modulated optical channels are multiplexed in step 520 to form a WDM optical signal. Finally, in step 525 the WDM optical signal is forwarded onto an optical transmission path.

In addition to reducing crosstalk that arises from Raman interactions, the methods and techniques described herein can also mitigate and even eliminate the affects of distortion that arise from Raman interactions, particularly second order distortion, which is known to be especially serious for analog signals. While analog channels are most vulnerable to such distortion, digital channels are also impacted and thus the methods and techniques described herein can reduce Raman distortion arising in both analog and digital signals.

The transmitter arrangement described above can be advantageously used in any optical network in which a broadcast signal is multiplexed onto multiple optical wavelengths or channels. Such networks include, without limitation, various all-optical networks, hybrid fiber-coax (HFC) networks and networks utilizing a passive architecture, which are often referred to as Passive Optical Networks (PONs). In typical HFC architectures, broadcast signal is split at optical hubs and then sent to different nodes together with narrowcast signals. At the fiber node the optical signal is converted into an electronic signal, and carried over multiple coax buses for distribution throughout a neighborhood. On the other hand, in a PON architecture, fibers carry signals from optical line terminator (OLT) to optical splitters, and further to optical-network units (ONUs), where optical-to-electronic conversion takes place. In the case of PON architectures, broadcast and narrowcast signals are sent in a similar manner. Both HFC and PONs generally carry the same downstream signals to multiple customers. In both networks multiple paths are typically used beyond the first node. Use of WDM in a fiber to a node allows further and more node segmentations. A primary advantage of a PON is its reliability, ease of maintenance and the fact that the field-deployed network does not need to be powered. Accordingly, PONs are often used as access networks by cable TV and telecommunications providers for the purpose of distributing their services from their facility to the customer premises (e.g., a home or business). One example of PONs is sometimes referred to as Broadband PON (BPON), which is a combination of a PON with wavelength division multiplexing (WDM) for downstream and upstream signals. The WDM techniques can be used for downstream signals and allow different optical wavelengths to support broadcast and multiple narrowcast (dedicated for each wavelength) transmissions on the fiber employed in the BPON. WDM can also be applied to different PON standards.

Figure 8:
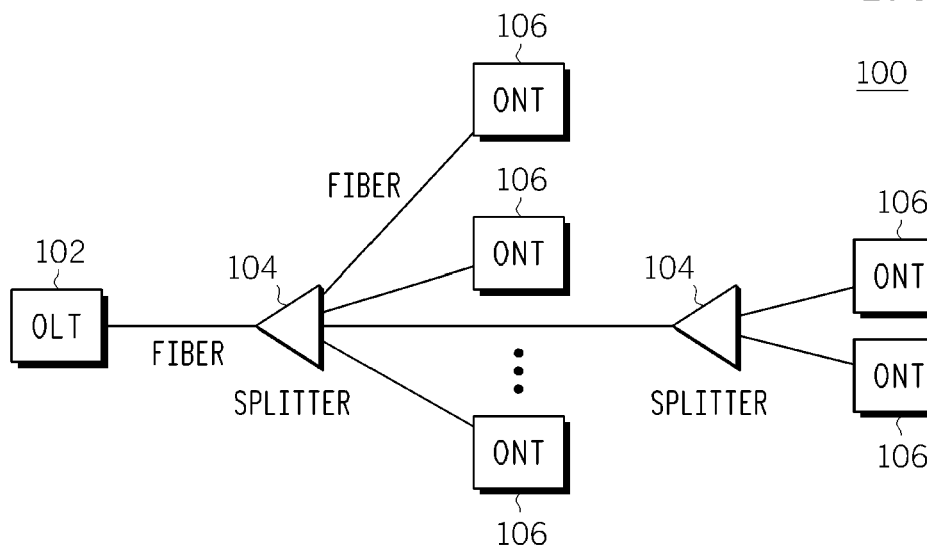
FIG. 8 shows the architecture of a Broadband Passive Optical Network (BPON) in which the transmitter arrangement of FIG. 5 may be employed.

FIG. 8 shows the architecture of a BPON in its most generalized form. The BPON 100 includes a hub 102, remote nodes 104 that are deployed in the field, and network interface units (NIUs) 106. The hub 102, remote nodes 104 and NIUs 106 are in communication with one another over optical fiber links. If the BPON 100 is a telecommunications network, hub 102 is a central office or called OLT. The NIUs 106 may be terminal equipment located on the customer premises or they may serve multiple customers, in which case the NIUs 106 simply provide another level in the network hierarchy below the remote nodes.

A method and apparatus has been described for reducing Raman induced crosstalk and distortion that arises among individual channels of a WDM optical signal, which are particularly severe among channels that are located near the zero dispersion wavelength of the transmission medium. The method and apparatus is particularly suitable when the individual channels support broadcast signals carrying the same information, which are sometimes transmitted over a transmission network such as an HFC or PON network.

The invention claimed is:

1. A method of transmitting a WDM optical signal, comprising:
   modulating a plurality of optical channels that are each located at a different wavelength from one another with a respective one of a plurality of information-bearing broadcast signals that all embody the same broadcast information, at least one of the broadcast signals being out of phase with respect to remaining ones of the plurality of broadcast signals;
   multiplexing each of the modulated optical channels to form a WDM optical signal; and
   forwarding the WDM optical signal onto an optical transmission path.

2. The method of claim 1 further comprising applying a phase shift of 180 degrees to said at least one of the plurality of broadcast signals relative to the remaining ones of the plurality of broadcast signals.

3. The method of claim 1 further comprising applying a phase shift to selected ones of the plurality of broadcast signals so that the optical channels modulated thereby have contributions to Raman crosstalk at a selected one of the optical channels that are diminished by contributions to Raman crosstalk from optical channels that do not undergo a phase shift.

4. The method of claim 1, wherein the step of modulating a plurality of optical channels further includes combining a narrowcast signal with each broadcast signal prior to modulating.

5. The method of claim 1 wherein the modulating further comprises:
   shifting a phase of a first broadcast signal with respect to a second broadcast signal, wherein the first and second broadcast signals modulate optical channels at first and second optical wavelengths, respectively, such that Raman crosstalk and distortions are reduced at a third optical channel that is located at a third optical wavelength.

6. The method of claim 1 wherein the modulating further comprises:
   phase shifting of at least one of a plurality of broadcast signals that all embody the same information, wherein the phase shifted broadcast signal(s) and remaining non-phase shifted signals modulate optical channels at different optical wavelengths, respectively, such that Raman crosstalk and distortions are reduced at a optical channel that is predetermined at a optical wavelength.

7. The method of claim 6 wherein a difference in wavelength between any of the optical channels is less than the maximum power transfer Stokes shift in the optical transmission path.

8. The method of claim 3 further comprising adjusting relative amplitudes of the first, second and third modulated optical channels to further reduce the Raman crosstalk.

9. The method of claim 4 further comprising adjusting relative amplitudes of the first, second and third modulated optical channels to further reduce the Raman crosstalk.

10. The method of claim 5 further comprising adjusting relative amplitudes of the first, second and third modulated optical channels to further reduce the Raman crosstalk.

11. The method of claim 3 further comprising adjusting relative laser polarization of the first, second and third modulated optical channels to further reduce the Raman crosstalk.

12. The method of claim 4 further comprising adjusting relative laser polarization of the first, second and third modulated optical channels to further reduce the Raman crosstalk.

13. The method of claim 5 further comprising adjusting relative laser polarization of the first, second and third modulated optical channels to further reduce the Raman crosstalk.

14. The method of claim 1 wherein the optical transmission path is located in a HFC network.

15. The method of claim 1 wherein the optical transmission path is located in a CATV transmission network.

16. The method of claim 1 wherein the optical transmission path is located in a PON.

17. The method of claim 1 wherein the optical channels are located at wavelengths at or near a zero dispersion wavelength of the transmission path.

18. The method of claim 1 wherein the optical channels are located at wavelengths remote to a zero dispersion wavelength of the transmission path but dispersion impact is not significant.

19. A WDM optical transmitter, comprising:
   a plurality of optical sources for generating optical channels located at different wavelengths;
   a plurality of optical modulators each having an input for receiving a respective one of a plurality of information-bearing broadcast signals that all embody the same broadcast information, each optical modulator being associated with a respective one of the plurality of optical sources to thereby provide a plurality of modulated optical channels;
   a phase shifter for adjusting a phase of at least one of the plurality of broadcast signals so that it is out of phase relative to another of the plurality of broadcast signals; and
   a multiplexer coupled to the plurality of optical sources to receive and combine the modulated optical channels to produce a multiplexed optical signal.

20. The WDM optical transmitter of claim 19 wherein the phase shifter is configured to apply a phase shift of 180 degrees to said at least one of the plurality of broadcast signals relative to the remaining ones of the plurality of broadcast signals.

21. The WDM optical transmitter of claim 19 wherein the phase shifter is configured to apply a phase shift to selected ones of the plurality of broadcast signals so that the optical channels modulated thereby have contributions to Raman crosstalk at a selected one of the optical channels that are diminished by contributions to Raman crosstalk from optical channels that do not undergo a phase shift.

22. The WDM optical transmitter of claim 21 wherein the phase shifter is configured to shift a phase of a first broadcast signal with respect to a second broadcast signal, wherein the first and second broadcast signals modulate optical channels at first and second optical wavelengths, respectively, such that Raman crosstalk and induced distortions are reduced at a third optical channel.

23. The WDM optical transmitter of claim 22 wherein the plurality of optical sources are configured so that a difference in wavelength between any of the first, second, and third optical channels is less than the maximum power transfer Stokes shift in an optical transmission path into which the optical signal is to be transmitted.

24. The WDM optical transmitter of claim 22 further comprising an amplitude adjuster for adjusting relative amplitudes of the first, second and third modulated optical channels to further reduce the Raman crosstalk.

25. The WDM optical transmitter of claim 22 further comprising a light polarization adjuster for adjusting relative light polarization of the first, second and third modulated optical channels to further reduce the Raman crosstalk and induced distortions.

26. The WDM optical transmitter of claim 19 wherein the optical channels are located at wavelengths at or near a zero dispersion wavelength of an optical transmission path into which the optical signal is to be transmitted.

27. The WDM optical transmitter of claim 19 wherein the optical channels are located at wavelengths remote from a zero dispersion wavelength of the transmission path into which the optical signal is to be transmitted.

28. The WDM optical transmitter of claim 19, wherein the plurality of optical modulators are configured to receive narrowcast signals which are combined with each broadcast signal prior to modulating.

* * * * *